(12) United States Patent
Yokota et al.

(10) Patent No.: US 6,628,591 B1
(45) Date of Patent: Sep. 30, 2003

(54) APPARATUS AND METHOD FOR RECORDING DATA ONTO A PREDETERMINED RECORDING MEDIUM

(75) Inventors: Teppei Yokota, Chiba (JP); Syuichi Nagano, Chiba (JP); Toshiyuki Kunimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 09/690,543

(22) Filed: Oct. 17, 2000

(30) Foreign Application Priority Data

Oct. 19, 1999 (JP) ............................................. 11-296365

(51) Int. Cl.⁷ .................................................. G11B 7/00
(52) U.S. Cl. ...................................... 369/53.21; 369/84
(58) Field of Search .......................... 369/84, 85, 53.21; 235/462.01

(56) References Cited

U.S. PATENT DOCUMENTS

| | | | |
|---|---|---|---|
| 5,453,968 A | 9/1995 | Veldhuis et al. | |
| 5,764,607 A | * 6/1998 | Maeda et al. | 369/47 |
| 6,070,799 A | * 6/2000 | Ashe | 369/84 |
| 6,137,642 A | * 10/2000 | Inoue | 369/84 |
| 6,370,320 B1 | * 4/2002 | Sugita et al. | 369/84 |

* cited by examiner

*Primary Examiner*—Nabil Hindi
(74) *Attorney, Agent, or Firm*—Frommer Lawrence & Haug LLP; William S. Frommer; Gordon Kessler

(57) ABSTRACT

In an operation to record information played back from a first recording medium into a second recording medium, control is executed to permit or prohibit the operation to record (dub or copy) the information into the second recording medium on the basis of a judgment as to whether the first recording medium is a recording medium that is permitted to be dubbed or prohibited from being dubbed. The control can be executed to permit or prohibit the operation to copy the information in accordance with the type of the first recording medium.

27 Claims, 12 Drawing Sheets

| SOURCE | PERMISSION OR PROHIBITION OF MEMORY-CARD RECORDING | RECORDING-LAYER STRUCTURE |
|---|---|---|
| CD-DA (CD-TEXT, CD-G) | O | SINGLE-PLATE DISC |
| CD-ROM (VIDEO CD) | X | |
| CD-RW | X | |
| CD-R | X | |
| DVD-ROM | X | SINGLE-LAYER HD DISC OR MULTI-LAYER HD DISC |
| DVD-R | X | |
| DVD-RW | X | |
| SA-CD | ONLY CD LAYER O | HYBRID DISC |
| MD-DA (PRE-MASTERED) | O | |
| MD-DA (RECORDABLE TYPE) | X | |
| MD-DATA | X | |
| TUNER | X | |
| EXTERNAL INPUT | X | |
| MO DISC | X | |

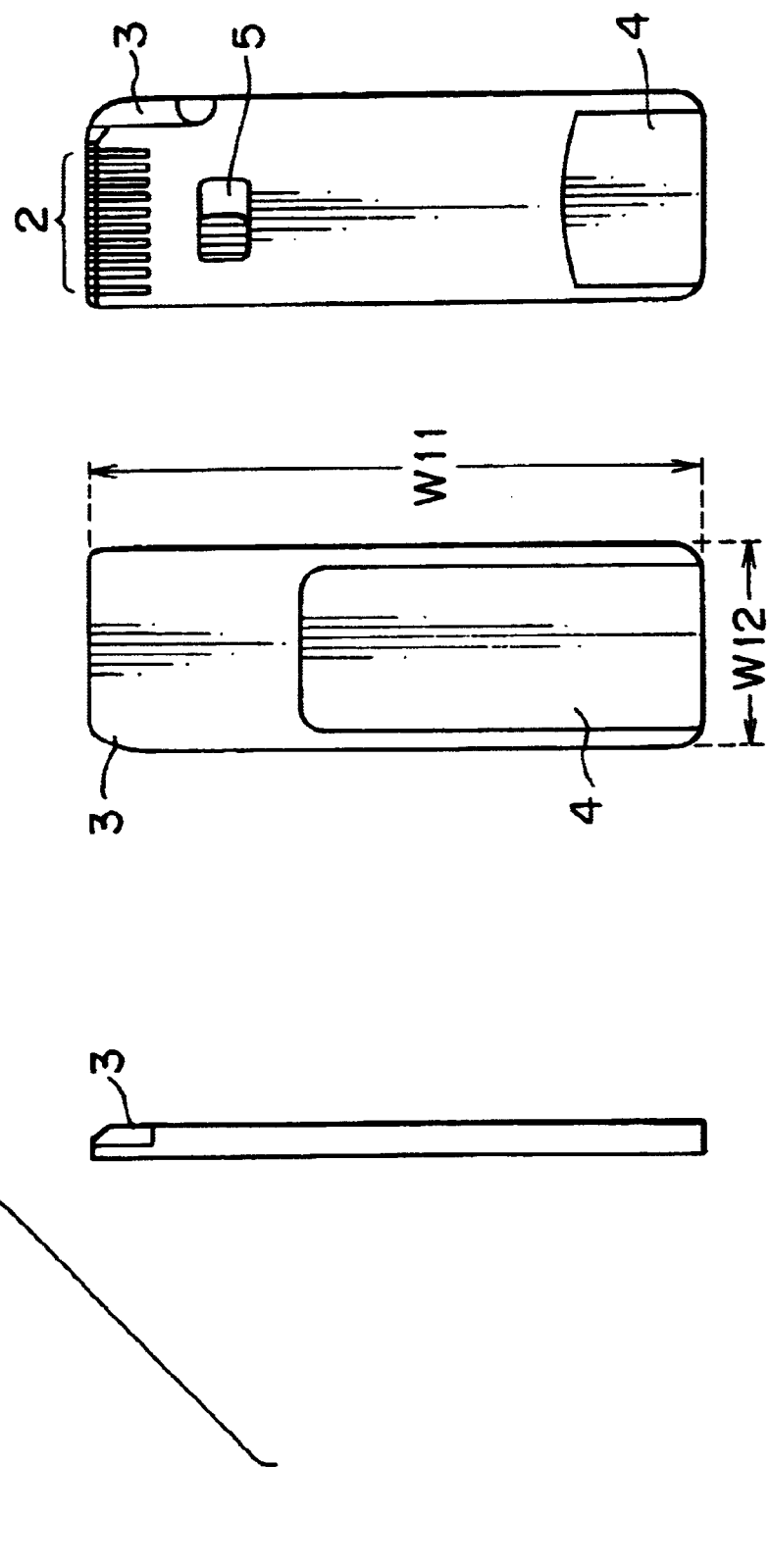

SINGLE-PLATE DISC (SUCH AS CD-DA, CD-R, CD-ROM AND CD-RW)

SINGLE-LAYER HD DISC (SINGLE-LAYER DVD)

HYBRID DISC (SACD)

MULTI-LAYER HD DISC (DUAL-LAYER DVD)

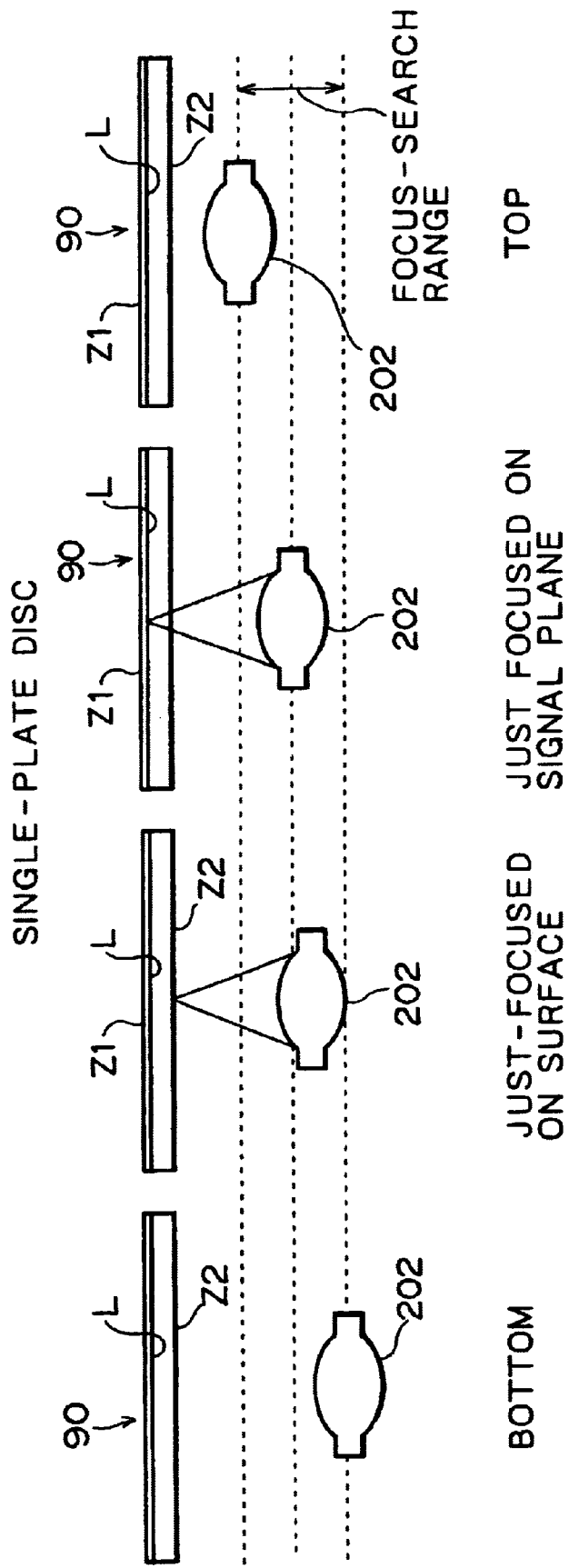

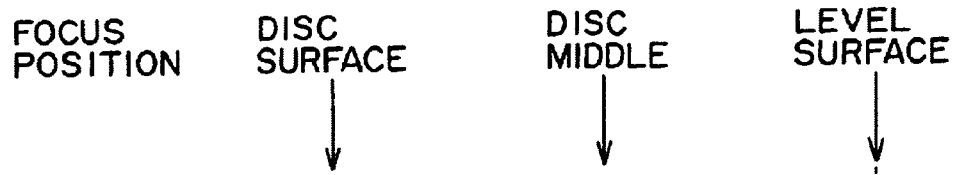
FIG. 9A SINGLE-PLATE DISC { S-CURVE, MR }
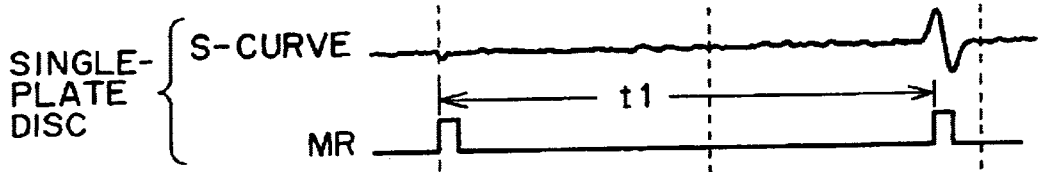
FIG. 9B SINGLE-LAYER HD DISC { S-CURVE, MR }
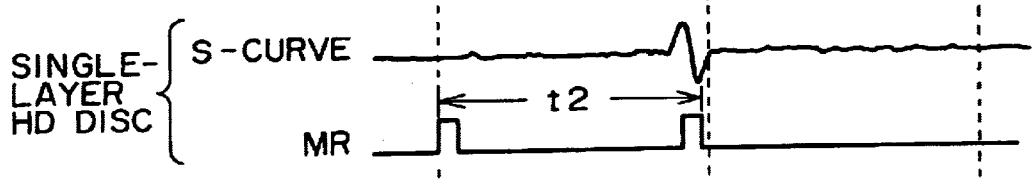
FIG. 9C HYBRID DISC { S-CURVE, MR }
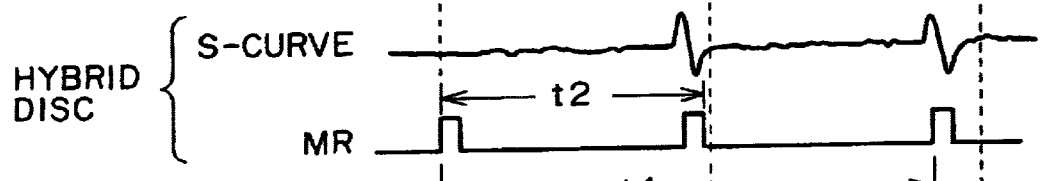
FIG. 9D MULTI-LAYER HD DISC { S-CURVE, MR }

FIG. 12

| SOURCE | PERMISSION OR PROHIBITION OF MEMORY-CARD RECORDING | RECORDING-LAYER STRUCTURE |
|---|---|---|
| CD-DA (CD-TEXT, CD-G) | O | SINGLE-PLATE DISC |
| CD-ROM (VIDEO CD) | × | |
| CD-RW | × | |
| CD-R | × | |
| DVD-ROM | × | |
| DVD-R | × | |
| DVD-RW | × | |
| SA-CD | ONLY CD LAYER O | SINGLE-LAYER HD DISC OR MULTI-LAYER HD DISC |
| MD-DA (PRE-MASTERED) | O | HYBRID DISC |
| MD-DA (RECORDABLE TYPE) | × | |
| MD-DATA | × | |
| TUNER | × | |
| EXTERNAL INPUT | × | |
| MO DISC | × | |

APPARATUS AND METHOD FOR RECORDING DATA ONTO A PREDETERMINED RECORDING MEDIUM

BACKGROUND OF THE INVENTION

The present invention relates to a recording apparatus and method for recording data played back from a variety of recording media onto a predetermined recording medium.

In recent years, a variety of different digital data formats for use in recording media have been developed, including formats for audio data, video data and computer data.

For example, as an optical-disc recording medium, the compact disc ("CD") has become very popular for use in a variety of applications. The CD is commonly used as a playback-only medium on which audio (music) data is pre-recorded as emboss pits. The format for such an audio (music) CD is commonly referred to as CD-Digital Audio ("CD-DA"). Recordable-type CDs, also known as CD-Recordables ("CD-R"s), and Rewritable-type CDs, known as CD-Rewritable ("CD-RW"s), have also been under development. CDs may also be used for storing computer data. A CD for storing such data is also called a CD-Read Only Memory ("CD-ROM").

In addition, an optical disc suitable for multimedia applications known as the Digital Versatile Disc or Digital Video Disc ("DVD"), is also being developed. The DVD has been proposed as a disc to be used in a variety of fields for storing data such as video data, audio data, and computer data.

The DVD is an optical disc with a diameter of 12 cm. The DVD is used for recording data at a track pitch of 0.8 m, which is equal to half the conventional CD track pitch of 1.6 m. The wavelength of a semiconductor laser for reading a DVD is 650 nm as compared to 780 nm for reading a CD. In addition, an Eight-to-Fourteen Modulation ("EFM") technique adopted in the CD is improved to implement a high recording density equivalent to about 4 Gbyte per surface for a DVD.

A multi-layer disc having two recording layers conforming to such DVD specifications is also under development. DVDs also include DVD-ROMs, DVD-RWs (Rewritable), and DVD-Rs (Recordable), which are analogous to their CD counterparts. DVD-RWs and DVD-Rs allow for recording and playback operations utilizing a phase change technique.

The Mini Disc ("MD"), which may be a magnetic disc or a magneto-optical disc having a diameter of 64 mm accommodated in a cartridge, is another medium for recording and playing back data.

The MD may be a playback-only optical disc on which audio (music) data is pre-recorded as emboss pits (similar to a music CD, i.e., a CD-DA). Such an MD is commonly referred to as a pre-mastered disc or, to be more specific, a pre-mastered MD-DA (Digital Audio). The MD may also be a recordable magneto-optical disc onto which audio (music) data may be recorded and from which the data may be played back by adopting a magnetic-field modulation technique. Such MDs are referred to as recordable MD-DAs.

The magneto-optical disc known as MD-DATA may be used for recording various kinds of data such that the disc can be used in apparatuses such as a computer.

It is noted that discs adopting the CD and DVD systems may be referred to merely as discs, while discs adopting the MD system are referred to as cartridge-discs.

Aside from the variety of disc-shaped recording media described above, small-size memory cards for mounting a non-volatile memory, such as a flash memory, have been in development as a recording device.

Various kinds of information may be written into and read out from such a memory card using a dedicated drive unit or equipment, such as an audio/video apparatus, or an information apparatus in which a drive unit is embedded. In a digital still camera including such an embedded drive unit, for example, data of a photographed still image is stored in a memory card. Devices for recording information such as computer data, video (e.g., still- or moving-picture) data, and audio (music) data on a memory card are also being developed.

One advantage of the memory card is that it does not require complex mechanical configurations, such as a rotation mechanism, a tape-traveling mechanism, a head mechanism, and a servo system; as is the case with systems for driving a disc-shaped recording medium or a tape recording medium. In addition, the memory card is superior in write and read speeds. These characteristics of a memory card provide for a low-cost, small power consumption, small-sized, and small-thickness storage medium. Furthermore, it is easy to mount a memory card onto a variety of units. These factors promote the development of a semiconductor memory card as a very useful memory storage medium.

As recordable (including rewritable) media for recording various kinds of digital data are becoming more popular (e.g., CD-R, CD-RW, DVD-R, DVD-RW, etc.), wherein a copy operation does not significantly degrade the quality of data, there is a need to protect copyrighted material from being freely copied onto such recordable media.

Completely forbidding any copying is impractical because high capacity storage media are often used for recording a private copy of (or "backing up") data for safe-keeping.

In order to solve the problem described above in an MD system for recording and playing back audio data, a digital copy of digital audio data recorded on a CD-DA is permitted only for a first generation. This permission of a copy for the first generation is implemented by a policy called a Serial Copy Management System ("SCMS").

However, the existence of such a variety of recording media described above, the existence of data compressing technologies of the variety of recording media, and different actual applications result in an unclear situation. In this situation, a boundary between permitting and forbidding a copy operation cannot help varying from medium to medium, from technology to technology and from application to application. For this reason, it is practically improper to uniformly regulate operations to copy data among the variety of recording media.

For example, the SCMS for permitting a digital copy only for the first generation can not be said to be suitable for all cases. This is because, in some cases, a policy to completely forbid a copy operation is considered to be desirable while, in other cases, a policy to permit copies of up to a second generation or even a further generation is deemed proper.

In addition, in recent years, popularization and improvement of data communication technologies, such as the Internet, and improvement of data compression technologies have also given rise to problems in copyright protection. High-quality data compression allows data to be presented to an unspecified number of users by way of the Internet or another communication network at a drastically reduced data amount without significant deterioration. Thus, users are able to upload and download compressed versions of copyrighted data (such as music files), and thereby distribute these compressed versions of the data.

In response, for discs such as the CD-DA, a digital watermark technology known simply as a watermark technology is being developed. This technology is a technology for including a watermark in data, wherein the watermark is erased in a process such as compression processing. Thus, by prohibiting an operation to record data when the watermark is not detected by a recording apparatus, compressing and copying of copyrighted data can be prevented. For example, it is therefore possible to prevent a copyright from being infringed by downloading and recording copyrighted data onto a disc, such as a CD-ROM, and illegally selling such a disc. However, a circuit for detecting a watermark must be provided in the recording apparatus. In addition, many discs, such as CD-DAs presently in circulation, do not necessarily have a watermark. Thus, the watermark technology is not a practical solution.

If the variety of recording media, their usage and the state of coexistence of copyright protection with the user's right to a private copy in the data copying matter described above are taken into consideration, it is necessary to finely control permission and inhibition of a digital copy in accordance with factors such as the type of a recording medium in a recording and playback apparatus.

OBJECTS AND SUMMARY OF THE INVENTION

The present invention was made in consideration of the above problem and has as an object the provision of a recording apparatus, a recording and playback apparatus, and a recording method which are capable of properly controlling operations to copy data from a recording medium to another.

Other objects and advantages of the invention will in part be obvious and will in part be apparent from the specification and the drawings.

According to a first aspect of the present invention, a recording apparatus includes recording means capable of recording information played back from a first recording medium into a second recording medium, judgment means for forming a judgment as to whether the first recording medium is a recording medium allowing a dubbing operation or a recording medium prohibiting a dubbing operation, and control means capable of inhibiting an operation carried out by the recording means to record information played back from the first recording medium into the second recording medium when the result of a judgment formed by the judgment means indicates that the first recording medium is a recording medium prohibiting a dubbing operation.

According to a second aspect of the present invention, a recording and playback apparatus includes playback means capable of playing back information from a first recording medium, recording means capable of recording information played back from the first recording medium into a second recording medium, judgment means for forming a judgment as to whether the first recording medium is a recording medium allowing a dubbing operation or a recording medium prohibiting a dubbing operation, and control means capable of inhibiting an operation carried out by the recording means to record information played back from the first recording medium into the second recording medium when the result of a judgment formed by the judgment means indicates that the first recording medium is a recording medium prohibiting a dubbing operation.

According to a third aspect of the present invention, a recording method includes a judgment step of forming a judgment as to whether a first recording medium is a recording medium allowing a dubbing operation or a recording medium prohibiting a dubbing operation, a recording step of recording information played back from the first recording medium into a second recording medium when the result of a judgment formed at the judgment step indicates that the first recording medium is a recording medium allowing a dubbing operation, and a recording inhibit step of inhibiting an operation to record information played back from the first recording medium into the second recording medium when the result of a judgment formed at the judgment step indicates that the first recording medium is a recording medium prohibiting a dubbing operation.

In the recording apparatus, the recording and playback apparatus and the recording method, the first recording medium may have a shape like a disc whereas the second recording medium may be a non-volatile memory.

The judgment as to whether a first recording medium is a recording medium allowing a dubbing operation or a recording medium prohibiting a dubbing operation may be based on information conveyed by a light reflected from the first recording medium or predetermined identification information recorded on the first recording medium.

A recording medium allowing a dubbing operation may be a playback-only recording medium while a recording medium prohibiting a dubbing operation is a recording medium onto which data can be recorded.

A recording medium allowing a dubbing operation may also be a playback-only recording medium on which whole information is recorded as emboss pits while a recording medium prohibiting a dubbing operation is a recording medium other than the recording medium allowing a dubbing operation.

A recording medium allowing a dubbing operation may also be a playback-only recording medium on which whole information serving as management information and audio data is recorded as emboss pits while a recording medium prohibiting a dubbing operation is a recording medium other than the recording medium allowing a dubbing operation.

By controlling permission and prohibition to record (or dub or copy) data onto the second recording medium on the basis of an outcome of the judgment as to whether a first recording medium is a recording medium allowing a dubbing operation or a recording medium prohibiting a dubbing operation, as described above, it is possible to implement data copy management according to the type of the first recording medium.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawing(s), in which:

FIG. 3 shows a top view, a front view, a side view and a bottom view of an external appearance of a memory card used in accordance with an embodiment of the present invention;

FIGS. 8A through 8D are diagrams showing a movement of a lens in a process of identifying the type of a disc in accordance with an embodiment of the present invention;

FIGS. 9A through 9D are diagrams showing a process of identifying the type of a disc in accordance with an embodiment of the present invention;

FIG. 12 is a table showing whether to permit or prohibit an operation to record data from various types of discs onto a memory card in accordance with an embodiment of the present invention.

DETAILED DESCRIPTION OF THE PREFERRED EMBODIMENT

A recording and playback apparatus in accordance with an embodiment of the present invention is capable of recording and playing back data into and from a variety of recording media, such as discs adopting the CD and DVD systems, cartridge-discs adopting the MD system, and a memory card.

In accordance with an embodiment, various kinds of data such as audio data, moving-picture data, still-picture video data, computer data, and text data may be recorded and played back. For illustrative purposes, the description of the recording and playing back of data will be that of audio data.

External Appearance of the Recording and Playback Apparatus

Figure 1:
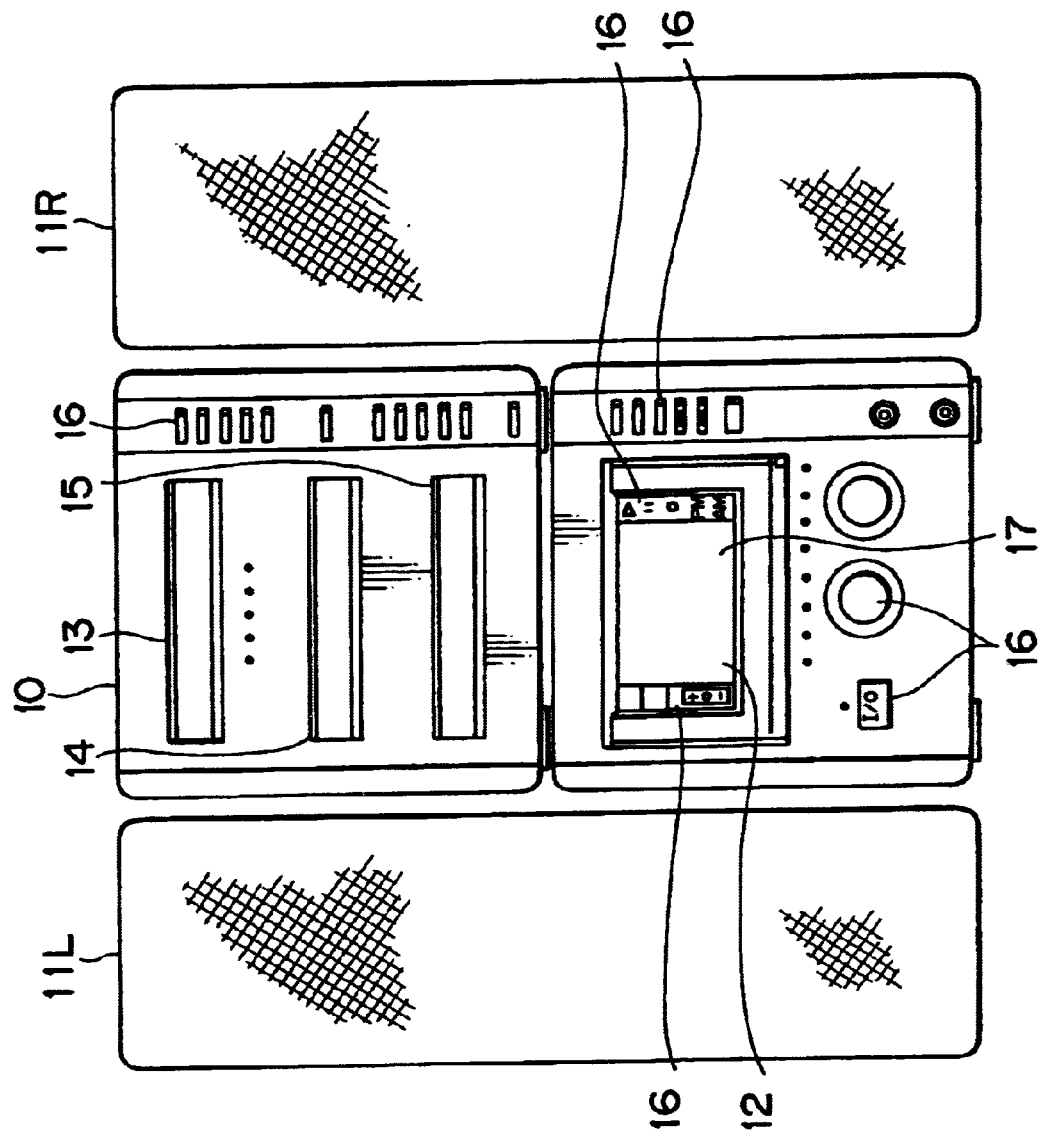
FIG. 1 is a diagram showing an external appearance of a recording and playback apparatus in accordance with an embodiment of the present invention.

The external appearance of a recording and playback apparatus 10 according to a preferred embodiment is shown in FIG. 1.

As shown in FIG. 1, recording and playback apparatus 10 is a component stereo system. Speakers 11L and 11R are placed on the left and right sides of recording and playback apparatus 10.

Recording and playback apparatus 10 comprises a disc insertion unit 13, a memory-card insertion unit 14, and a cartridge-disc insertion unit 15.

Figure 2A:
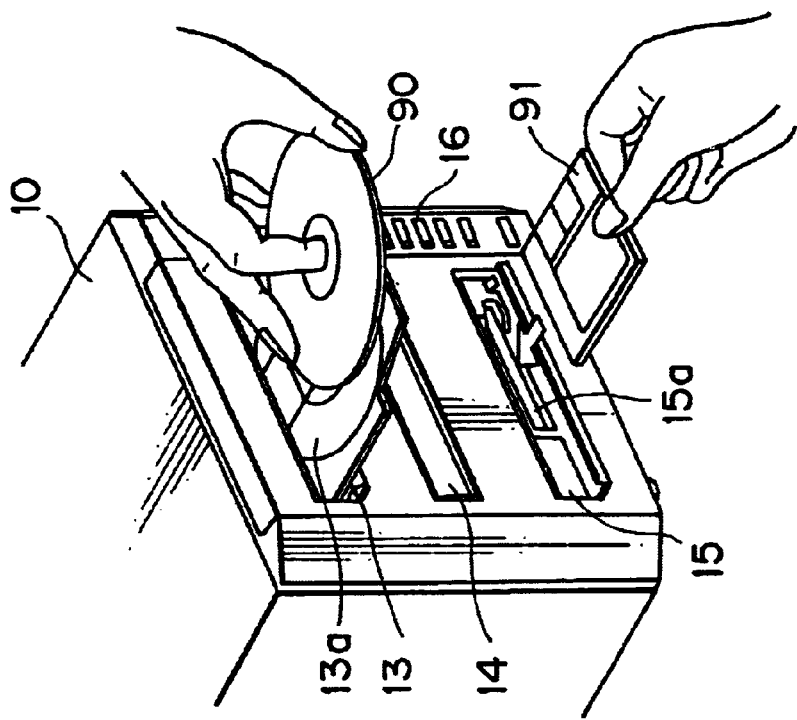
FIGS. 2A and 2B are diagrams showing how to mount recording media onto the recording and playback apparatus in accordance with an embodiment of the present invention.

As shown in FIG. 2A, disc insertion unit 13 has a front cover and a tray 13a and the front cover may be opened to allow tray 13a to be drawn out by a user. A disc 90, e.g., (CD or DVD), may be placed by the user on tray 13a to be mounted on disc insertion unit 13. Disc 90 may also be a CD-DA, a CD-ROM, a DVD-ROM, a DVD-RW or the like.

When the user opens a front cover of cartridge-disc insertion unit 15, an insertion opening 15a is exposed to the user, as shown in FIG. 2A. The user may then insert a cartridge-disc 91 (e.g., MD) into insertion opening 15a. Cartridge-disc 91 may also be a pre-mastered MD-DA, a recordable MD-DA, an MD-DATA or the like.

Figure 2B:
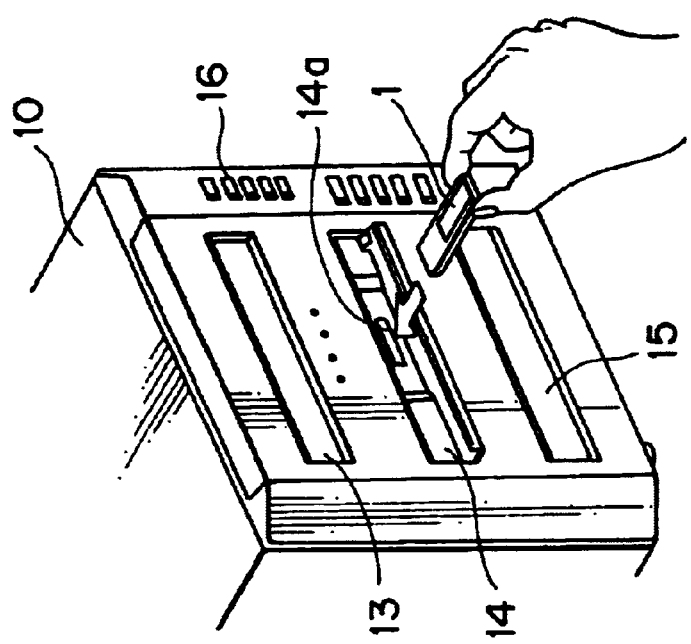

When the user opens a front cover of memory-card insertion unit 14, an insertion opening 14a is exposed to the user, as shown in FIG. 2B. The user may then insert a memory card 1 (e.g., Memory Stick) into insertion opening 14a.

Referring back to FIG. 1, recording and playback apparatus 10 also has a display unit 12 implemented by a liquid-crystal panel for displaying data, such as information on recording and playback operations and time information. The information on recording and playback operations may include operating modes of a recording medium undergoing a recording or playback operation. Display unit 12 may also display information added to data (e.g., the title and/or artist of a song) being played back, a guide message explaining an operation, and/or a menu screen for playback and edit operations, and the like.

Display unit 12 includes a touch panel 17 typically used for displaying operation keys accompanying a displayed menu screen. The user may touch a displayed operation key (not shown) displayed on touch panel 17 to carry out an input operation.

A variety of operators 16 are also included on recording and playback apparatus 10, as shown in FIG. 1. Operators 16 may include an operation key for requesting a recording or playback operation, an operation key for inserting or ejecting a recording medium, a power-supply operation key, an operation dial for adjusting the volume of a sound and a jog dial applicable to a variety of operations.

Recording and playback apparatus 10 may also include a variety of terminals (not shown) for connecting to various kinds of equipment. For example, recording and playback apparatus 10 may be provided with a headphone terminal, a microphone input terminal, a line input terminal, a line output terminal and a digital audio input/output terminal for inputting and outputting (using, e.g., an optical cable) audio signals. In addition, by providing an IEEE1394 connector, a USB connector, an SCSI connector, a serial port, an RS232C connector, and the like, various kinds of data can be exchanged with external equipment.

External Appearance of a Memory Card

An external appearance of memory card 1 is shown in FIG. 3.

As shown in FIG. 3, memory card 1 includes an external planar card case for encasing a semiconductor memory device having a predetermined storage capacity. In a preferred embodiment, a flash memory is used as the semiconductor memory device. The internal components of memory card 1 according to an embodiment of the invention will be described in further detail below with reference to FIG. 5.

FIG. 3 shows a top view, a front view, a side view and a bottom view of a card case which may be created by a plastic mold. As shown in FIG. 3, dimensions of the card case may be a width W11 (of 60 mm), a width W12 (of 20 mm), and a width W13 (of 2.8 mm).

A terminal unit 2 with 10 electrodes may be spread from the lower portion of the front surface of the card case to a side of the bottom of the case for reading data out of and writing data into memory card 1 therethrough.

A cut 3 is provided on the left upper part of the card case in the planar direction. Cut 3 prevents memory card 1 from being mounted on a mounting and dismounting mechanism of apparatus 10 with an incorrect orientation.

A label sticking surface 4 is stretched from the top of the card case to the bottom thereof for placing a user label.

In addition, a slide switch 5 for preventing incorrect erasure of data stored in memory card 1 is provided on the bottom of the card case.

Memory card 1 may include a flash memory with a storage capacity of 4, 8, 16, 32, 64 or 128 megabytes ("MB"). A so-called File Allocation Table ("FAT") system may be used as a file system for implementing operations to record and play back data. In accordance with an embodiment of the invention, a write speed is in the range of 1,500 Kbyte/sec to 330 Kbyte/sec; a read speed is 2.45 Mbyte/sec; a write-operation unit is 512 bytes; the size of an erased block is 8 KB or 16 KB; the voltage Vcc of the power supply is in the range of 2.7 V to 3.6 V; and the frequency of a serial clock signal SCLK is up to 20 MHz.

It is noted that the shape of memory card 1 to be mounted on recording and playback apparatus 10 may be different from the one described above. For example, memory card 1 may have the size and shape of a business card.

The storage capacity, the application, and the type of stored data may also vary from card to card.

Internal Configuration of the Recording and Playback Apparatus

Figure 4:
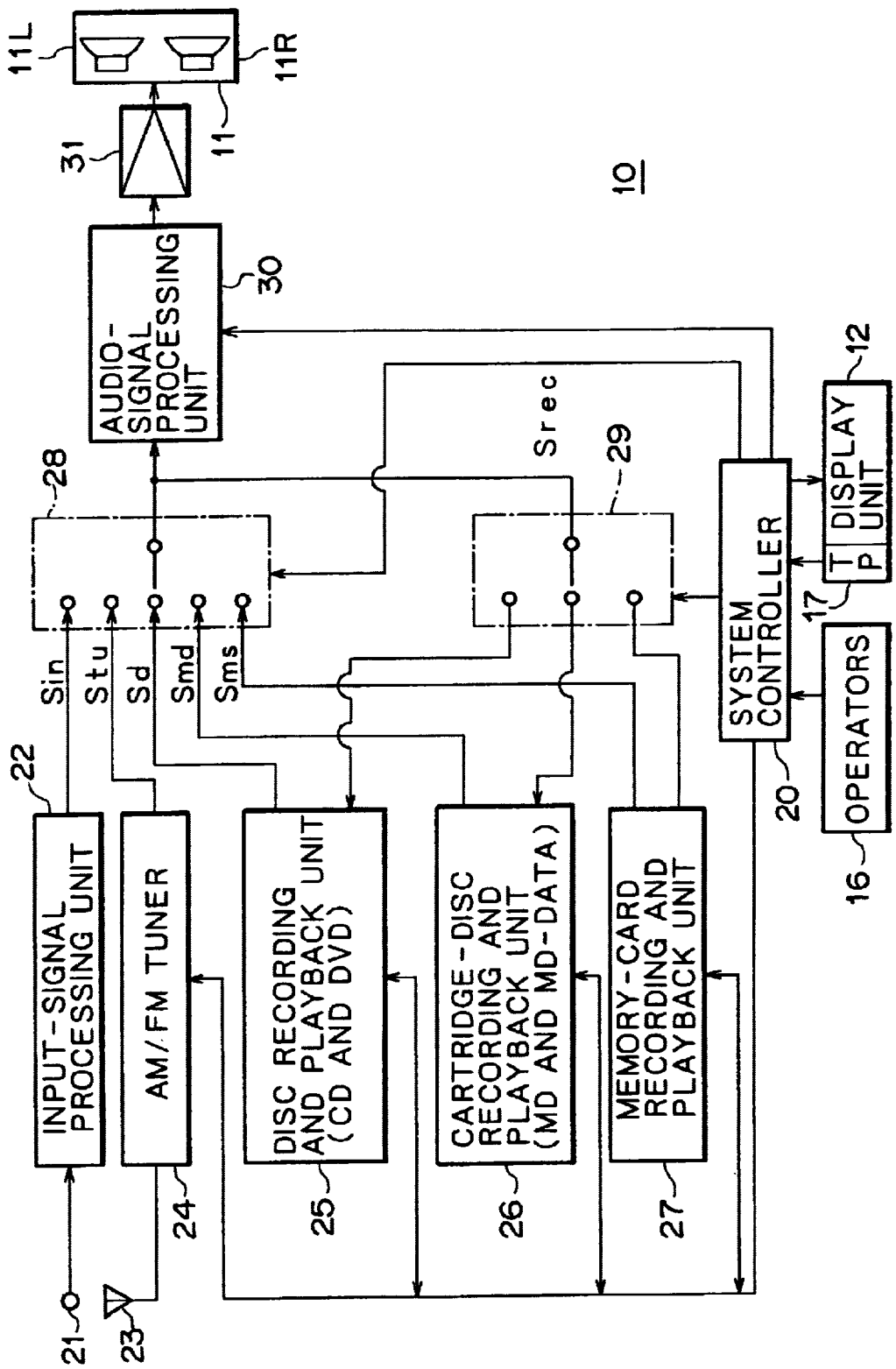
FIG. 4 is a diagram showing main components of a recording and playback apparatus in accordance with an embodiment of the present invention.

FIG. 4 is a diagram showing the internal configuration of recording and playback apparatus 10 according to an embodiment of the invention. For illustrative purposes, operations for audio data is illustrated, and components, including a system for processing information, such as video data, and an interface with external equipment, are excluded for simplicity.

In accordance with an embodiment of the invention, the operation of recording and playback apparatus 10 is controlled by a system controller 20 which may be implemented by a microcomputer.

System controller 20 executes an internal operating program to drive necessary components to carry out required operations in accordance with information on the operations received from the variety of operators 16 (also shown in FIG. 1) and information on the operations received from touch panel 17.

System controller 20 also displays various kinds of information and operation keys for touch panel 17 on display unit 12 in accordance with the operating state.

FIG. 4 is a diagram showing components in recording and playback apparatus 10 for outputting audio data from a variety of sources to speakers 11L and 11R in accordance with an embodiment of the invention. The sources of the audio data output to speakers 11L and 11R include an external input, an AM/FM radio broadcast, disc 90 (which may be a CD or a DVD), cartridge-disc 91 (e.g., an MD), and memory card 1.

A terminal 21 is a terminal for inputting digital or analog audio data from an external apparatus. External data input through terminal 21 is amplified and subjected to processes such as filtering in an input-signal processing unit 22. If terminal 21 serves as a terminal for inputting an analog audio signal, the input analog audio signal is converted into digital data in an Analog-to-Digital ("A/D") conversion process.

External input data Sin generated by input-signal processing unit 22 is supplied to a terminal of a source select unit 28.

An AM/FM tuner 24 receives and demodulates an AM or FM radio broadcast extracted from a wave received by an antenna 23 to obtain a broadcast audio signal.

The demodulated broadcast audio signal is converted in an A/D conversion process into digital data. The broadcast audio data Stu generated by AM/FM tuner 24 is supplied to an input terminal of source select unit 28.

It is noted that selection of a station frequency by AM/FM tuner 24 may be controlled by system controller 20 in accordance with an operation of operators 16 and/or operation keys on touch panel 17 by the user.

Figure 6:
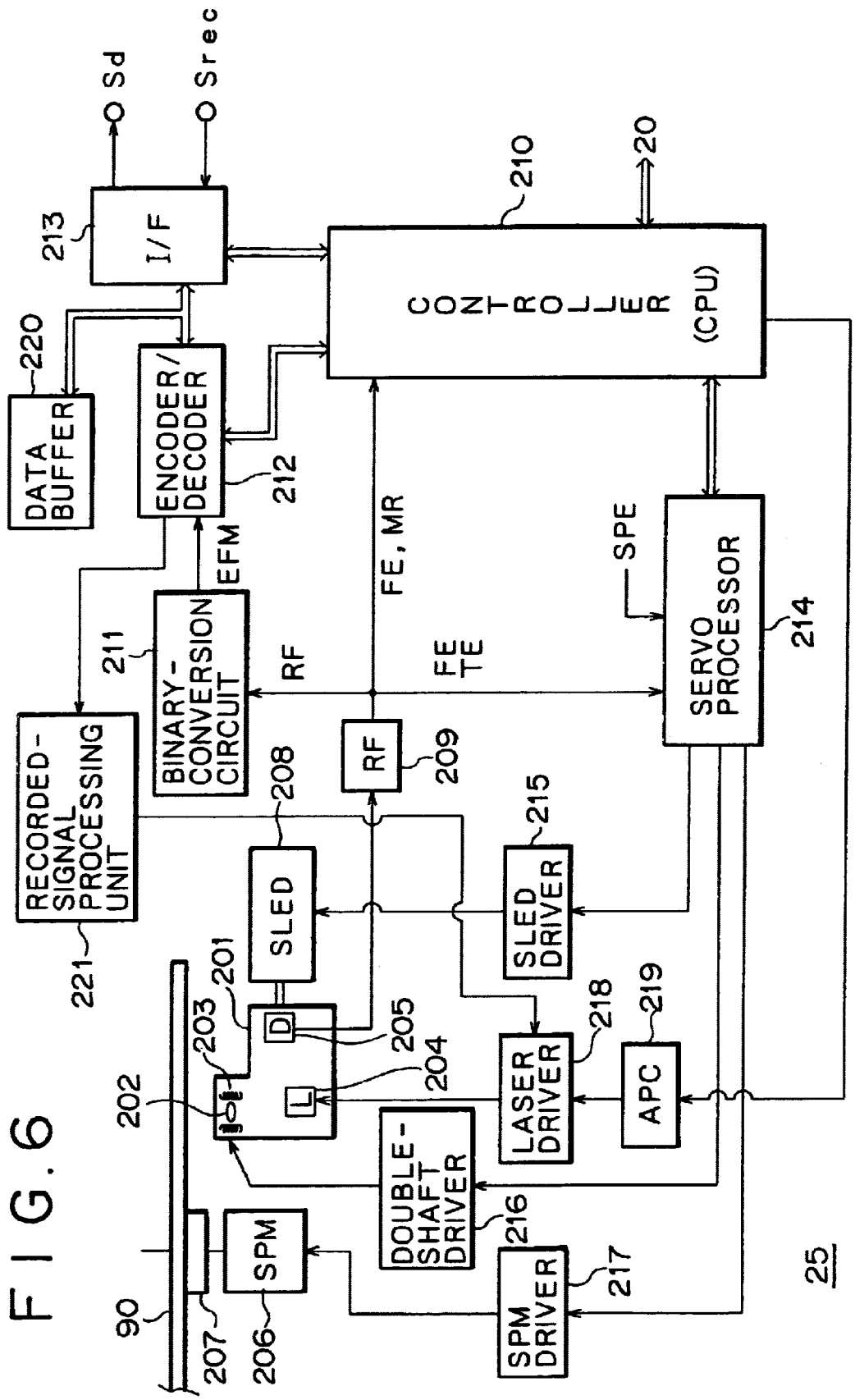
FIG. 6 is a diagram showing a disc recording and playback unit of a recording and playback apparatus in accordance with an embodiment of the present invention.

A disc recording and playback unit 25 for playing back and recording data from and into disc 90 as controlled by system controller 20 will be described in further detail below with reference to FIG. 6.

Playback data Sd played back from disc 90 by disc recording and playback unit 25 is supplied to an input terminal of source select unit 28.

A cartridge-disc recording and playback unit 26 for playing back and recording data from and into cartridge-disc 91, which may be an MD mounted through cartridge-disc insertion unit 15 shown in FIG. 1 is similarly controlled by system controller 20.

Playback data Smd played back from cartridge-disc 91 by cartridge-disc recording and playback unit 26 is supplied to an input terminal of source select unit 28.

A memory-card recording and playback unit 27 is included for playing back and recording data from and into memory card 1 mounted through memory-card insertion unit 14 shown in FIG. 1. The recording and playback operations are also controlled by system controller 20.

Memory-card recording and playback unit 27 will be described in further detail below with reference to FIG. 5.

Playback data Sms played back from memory card 1 by memory-card recording and playback unit 27 is supplied to an input terminal of source select unit 28.

Source select unit 28 selects an input terminal in accordance with control executed by system controller 20. In this way, digital audio data generated by a source selected by the user is supplied to an audio-signal processing unit 30.

Audio-signal processing unit 30 includes a Digital Signal Processor ("DSP"). Filtering, adjustment of the sound quality, and adjustment of the volume of the digital audio data are controlled by system controller 20.

The digital audio data is converted in a Digital-to-Analog ("D/A") conversion process into an analog audio signal after processing, and supplied to a power amplifier 31.

Power amplifier 31 amplifies the analog audio signal and supplies the amplified signal to speakers 11 as an output sound.

The operations carried out by the components of apparatus 10 as described above allow the user to select an external input, an AM/FM broadcast, disc 90, cartridge-disc 91, or memory card 1 as a sound source and listen to an audio output therefrom (such as a piece of music).

Audio data selected by source select unit 28 is supplied to a recording select unit 29 as data Srec for recording.

Recording select unit 29 selects a connection terminal in accordance with control executed by system controller 20. The data Srec to be recorded is supplied to either of disc recording and playback unit 25, cartridge-disc recording and playback unit 26, or memory-card recording and playback unit 27.

The to-be-recorded data Srec supplied to disc recording and playback unit 25, cartridge-disc recording and playback unit 26, or memory-card recording and playback unit 27 may be recorded onto disc 90, such as a CD-RW or a DVD-R, cartridge-disc 91, such as a recordable MD-DA or an MD-DATA, or memory card 1 as audio data.

In such a configuration, the user is able to record (or to dub) audio data generated by a selected source into one of the recording media.

Thus, with the configuration described above, one of the external input data Sin, the broadcast audio data Stu, the playback data Smd, and the playback data Sms may be recorded onto disc 90, cartridge-disc 91, or memory card 1.

As will be described in detail below, however, an operation to record the playback data Sd reproduced from disc 90 onto memory card 1 may be permitted only if disc 90 has a CD layer of a CD-DA or a Super Audio CD ("SACD") in accordance with an embodiment of the invention. Similarly, an operation to record the playback data Smd reproduced from cartridge-disc 91 onto memory card 1 may be permitted only if cartridge-disc 91 is a pre-mastered MD-DA.

An operation to record playback data Sd or Smd reproduced from disc 90 or cartridge-disc 91 not included in the specific categories described above, the external input data Sin, and the broadcast audio data Stu may be blocked by system controller 20 from memory-card recording and playback unit 27.

In addition, in source select unit 28 and recording select unit 29, signals are transferred at a digital-data stage and the data Srec to be recorded is supplied to memory-card recording and playback unit 27 or another recording and playback unit as digital data. Although only restrictions on copying digital data into memory card 1 has been described so far, it is noted that signal routes for supplying audio signals to disc recording and playback unit 25, cartridge-disc recording and playback unit 26, and memory-card recording and playback unit 27 as signals to be recorded can also be provided with similar restrictions.

If an analog audio signal is transferred, that is, if the analog audio signal is subjected to an A/D conversion process before being recorded by memory-card recording and playback unit 27 or another recording/playback unit, a recording restriction may not be required in memory-card recording and playback unit 27 or the other recording/playback unit because, among other reasons, a similar effect may be accomplished by controlling (restricting) the A/D conversion process.

Figure 5:
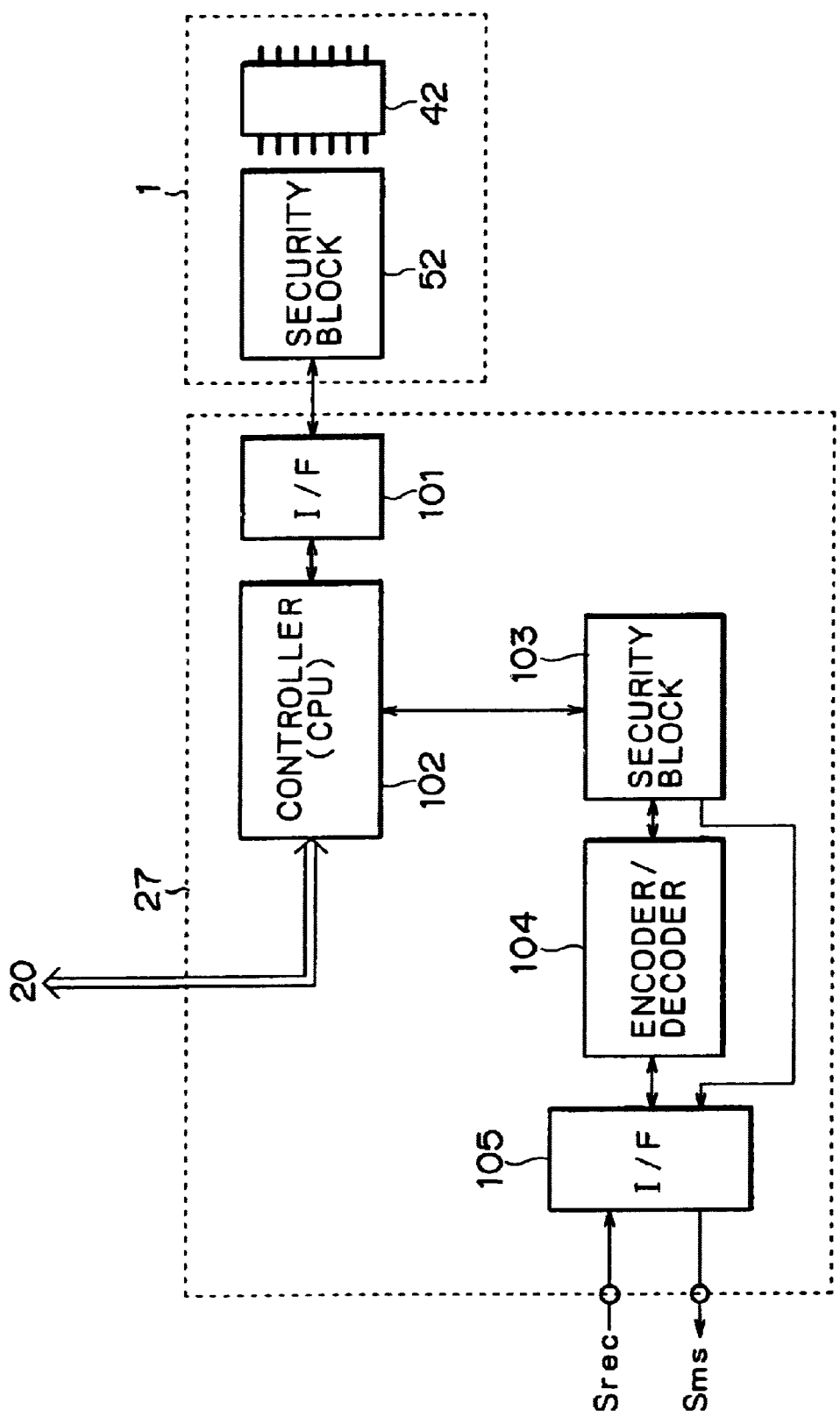
FIG. 5 is a diagram showing a memory-card recording and playback unit of a recording and playback apparatus in accordance with an embodiment of the present invention.

A configuration of memory-card recording and playback unit 27 is shown in FIG. 5.

As shown in FIG. 5, memory-card recording and playback unit 27 records and plays back information such as digital audio data into and from memory card 1 on which a flash memory 42, a security block 52, and an access/control circuit (not shown) for flash memory 42 are mounted. It is noted that memory-card recording and playback unit 27 or a system for recording and playing back data into and from memory card 1 is also capable of recording and playing back other kinds of data, such as moving-picture data and still-picture data.

The digital audio data may be distinguished into audio data (or voice data) or Hi-Fi audio data (musical data).

Memory card 1 may or may not include a security block 52. Security block 52 is a component for carrying out authentication or encryption for protecting copyrighted data. Thus, in a memory card used in an application requiring neither authentication nor encryption, security block 52 is not needed. An example of an application requiring neither authentication nor encryption is an application to record an audio signal such as voice data which does not need copyright protection as may be the case with conference voice recordings. For illustrative purposes, security block 52 is included.

As shown in FIG. 5, memory-card recording and playback unit 27 comprises a controller (or a CPU) 102 and a security block 103 connected to controller 102.

Controller 102 exchanges a variety of control signals with system controller 20 and controls operations to record and play back data into and from memory card 1 in accordance with a command issued by system controller 20.

Security block 103 includes a Data Encryption Standard ("DES") encryption. circuit (not shown) and an authentication processing circuit (not shown).

Memory-card recording and playback unit 27 further has an audio interface 105 and an encoder/decoder 104. Audio interface 105 outputs playback data Sms to source select unit 28 and inputs data Srec to be recorded from recording select unit 29.

Encoder/decoder 104 encodes digital audio at a high efficiency and decodes high-efficiency encoded data.

As a technique for encoding data at a high efficiency, an ATRAC3 method is adopted. ATRAC3 is an improved technique of an Adaptive Transform Acoustic Coding ("ATRAC") method. In the ATRAC3 method, samples obtained as a result of sampling at 44.1 kHz are processed. Each of the samples is audio data having a size of 16 bits. A sound unit ("SU") is a minimum data unit used in the processing of audio data in accordance with the ATRAC3 method. 1 SU is obtained as a result of compressing 1,024 samples (which have a size of 1,024 samples/channel×16 bits/sample×2 channels) to a size of several hundreds of bytes. 1 SU corresponds to a period of about 2.3 msec. By the ATRAC3 method, audio data is compressed to data with an amount of about 1/10 times the original quantity. It should be noted that the compression and decompression processes result in very little deterioration of sound quality.

Encoder/decoder 104 encodes to-be-recorded digital audio data Srec received from recording select unit 29 by way of audio interface 105 at a high efficiency and supplies the encoded data to security block 103.

Security block 103 encrypts the encoded data received from encoder/decoder 104.

Security block 103 and security block 52 of memory card 1 are provided for protection of copyrighted content, which may include digital audio data. Security block 103 of memory-card recording and playback unit 27 has a plurality of master keys and storage keys which are each unique to an apparatus (apparatus 10). Encryption and decryption are carried out by using those keys.

In addition, a random-number generation circuit (not shown) is provided for generating a session key. When memory card 1 including embedded security block 52 is mounted on memory-card recording and playback unit 27, memory-card recording and playback unit 27 authenticates memory card 1 by forming a judgment as to whether or not memory card 1 is valid. If the result of the authentication indicates that memory card 1 is valid, a session key can be shared with security block 52. Security block 103 and security block 52 each have an authentication function for such an authentication operation.

Input audio data is encoded at a high efficiency by encoder/decoder 104 and encrypted by security block 103, as described above, before being supplied to controller 102.

Controller 102 communicates with memory card 1 mounted on memory-card recording and playback unit 27 through a memory interface 101. The communication between controller 102 and memory card 1 through memory interface 101 is a serial communication.

To be more specific, controller 102 supplies the digital audio data encrypted by security block 103 to memory card 1 by way of memory interface 101. In memory card 1, the digital audio data is stored in flash memory 42.

As a result, the to-be-recorded data Srec input as digital audio data is eventually recorded on memory card 1 through the route described above.

In an operation to play back audio data from memory card 1, controller 102 reads out the data from flash memory 42 through memory interface 101 and has the data transferred thereto.

The audio data readout from flash memory 42 is encrypted audio data which is supplied to security block 103 to be decrypted. The decrypted data is further decoded by encoder/decoder 104.

The decoding process carried out by encoder/decoder 104 results in samples of 16-bit audio data with a sampling frequency of 44.1 kHz. This audio data is supplied to source select unit 28 by way of audio interface 105 as the playback data Sms.

In the above description, digital audio data to be recorded into memory card 1 is encrypted by security block 103 employed in memory-card recording and playback unit 27 and digital audio data played back from memory card 1 is decrypted also by security block 103. It is noted, however, that the encryption and decryption processes may also be carried out by security block 52 employed in memory card 1.

As an alternative, the encryption process in a recording operation may be carried out by security block 103 while the decryption process in a playback operation is performed by security block 52. The encryption process in a recording operation may also be carried out by security block 52 while the decryption process in a playback operation is performed by security block 103.

As another alternative, in a recording operation, the encryption process may be carried out twice, that is, once in security block 103 and another one in security block 52. In a playback operation, security block 52 and security block 103 may perform decryption processes opposite to the encryption processes carried out in the recording operation.

By providing security block 103 and security block 52 with the same encryption function, a key for encryption and decryption can be shared by and exchanged between them. Thus, a system adopted by security block 103 can be applied to security block 52, and vice versa.

In addition to the encryption and decryption functions, security block 103 and security block 52 may each have an authentication function. With memory card 1 mounted on memory-card recording and playback unit 27, authentication data may be exchanged between security block 103 and security block 52. The exchanged authentication data is used for forming a judgment as to whether the authentication is valid or not ("OK" or "NG"). In the case of an invalid ("NG") authentication result, memory-card recording and playback unit 27 may prohibit data to be recorded into or played back from memory card 1.

The authentication may be carried out as follows. When memory card 1 is mounted on memory-card recording and playback unit 27, memory-card recording and playback unit 27 transfers first authentication data stored in security block 103 to memory card 1. Security block 52 employed in memory card 1 generates second authentication data for the first authentication data by adoption of a technique determined in advance. The second authentication data is added to the first authentication data and both are transferred to memory-card recording and playback unit 27.

In memory-card recording and playback unit 27, controller 102 forms a judgment as to whether or not the second authentication data has been properly generated for the first authentication data, that is, a judgment as to whether the authentication is valid.

As will be described in detail later, when the user issues a command to record playback data Sd or Smd reproduced from disc 90 or cartridge-disc 91 by disc recording and playback unit 25 or cartridge-disc recording and playback unit 26 onto memory card 1, system controller 20 forms a judgment as to whether the requested recording operation is permitted or prohibited in accordance with the type of disc 90 or cartridge-disc 91, notifying controller 102 of the outcome of the judgment.

If the requested recording operation is prohibited, system controller 20 issues a recording inhibit command to controller 102 in order to prohibit the recording operation.

Next, the configuration of disc recording and playback unit 25 is explained with reference to FIG. 6.

In disc recording and playback unit 25, a controller 210 exchanges a variety of control signals with system controller 20, and controls operations to record and play back data into and from disc 90 in accordance with a command received from system controller 20.

Disc 90, which can be a CD or a DVD, is mounted on a turn table 207 driven to rotation by a spindle motor 206 at a Constant Linear Velocity ("CLV") or a Constant Angular Velocity ("CAV") in a recording or playback operation.

A pickup 201 reads out data recorded on disc 90 in an emboss pit format or a variable-phase pit format.

Pickup 201 includes an objective lens 202, a double-shaft mechanism 203, a semiconductor laser diode 204, a detector 205 for receiving a reflected light from optical disc 90, and an optical system (not shown) serving as paths for a light emitted by semiconductor laser diode 204 and a light reflected by optical disc 90.

In order to make pickup 201 compatible with a DVD-type disc, semiconductor laser diode 204 serving as a laser light source emits a laser light with a center wavelength of 650 nm or 635 nm and objective lens 202 with a numerical aperture ("NA") of 0.6 is employed.

Normally, in order to make pickup 201 compatible with a CD-type disc, a laser light with a center wavelength of 780 nm is emitted and objective lens 202 with an NA of 0.45 is employed. By making pickup 201 compatible with a DVD-type disc, there would be no problems even if a CD-DA, a CD-ROM or a CD-RW is used. In the case of a CD-R wherein pits are created as variations in color matter film, the color matter film exhibits a characteristic dependent on the wavelength of the laser light. Thus, the 650 nm and 635 nm wavelengths are not suitable for recording and playing back data into and from a CD-R.

In pickup 201, objective lens 202 is supported by double-shaft mechanism 203 in such a way that objective lens 202 can be moved in tracking and focusing directions.

In addition, pickup 201 as a whole can be moved by a sled mechanism 208 in the radial direction of disc 90.

In an operation to play back data from disc 90, semiconductor laser diode 204 of pickup 201 is driven by a laser driver 218 to emit a laser beam to disc 90. At that time, a beam reflected by disc 90 is received by detector 205. An electrical signal representing the quantity of the reflected beam is generated by detector 205 and supplied to a Radio Frequency ("RF") amplifier 209. Controller 210 sets a control value of the power of the laser beam in an auto power control circuit 219 which controls laser driver 218 to emit a laser beam in accordance with the control value of the laser power.

RF amplifier 209 comprises components including a current-voltage conversion circuit (not shown), an amplifier circuit (not shown), and a matrix processing circuit (not shown), which generate required signals based on the electrical signal received from detector 205. The signals generated by RF amplifier 209 may include an RF signal representing playback data, a focus-error signal FE for control of a focusing servo, a tracking-error signal TE for control of a tracking servo, a sum signal representing the quantity of a received light, and a mirror signal MR. The mirror signal MR is a signal obtained as a result of comparison of the sum signal with a threshold value, and is a pulse signal representing a mirror surface on disc 90. A mirror surface is a portion on disc 90 where no pits are created. The mirror signal MR corresponds to the so-called S-curve of the focus-error signal FE, which is observed during a focus-search operation. In other words, the mirror signal MR corresponds to a window showing a possible-focus-lead-in range.

The variety of signals generated by RF amplifier 209 are distributed to a binary-conversion circuit 211, a servo processor 214, and controller 210. More specifically, the playback RF signal is supplied to binary-conversion circuit 211 from RF amplifier 209, whereas the focus-error signal FE, the tracking-error signal TE are supplied to servo processor 214. The focus-error signal FE is also supplied to controller 210 along with the mirror signal MR.

It is noted that the focus-error signal FE and the mirror signal MR are supplied to controller 210 to be used in processing to determine the type of disc 90, as will be described in further detail below.

The playback RF signal generated by RF amplifier 209 is converted by binary-conversion circuit 211 into an EFM signal in the case of a CD-type disc or an EFM-plus signal (an Eight-to-Sixteen Modulation signal) in the case of a DVD-type disc. The EFM signal or the EFM-plus signal is then supplied to an encoder/decoder 212.

In encoder/decoder 212, EFM demodulation and error correction based on Cross Interleave Reed Solomon Coding ("CIRC") are carried out if disc 90 is a CD-type disc, such as a CD-DA, or data is played back from a CD layer of a hybrid disc to be described later.

If disc 90 is a DVD-type disc (or a multi-layer HD disc or a single-layer HD disc to be described later), or data is played back from an HD layer of a hybrid disc to be described later, on the other hand, EFM-plus demodulation and error correction based on product codes are carried out.

If necessary, processes such as CD-ROM decoding and MPEG decoding are further carried out to play back information read out from disc 90.

Encoder/decoder 212 stores decoded data in a data buffer 220 which serves as a memory unit.

An interface unit 213 is a component for outputting audio data Sd to source select unit 28 and inputting audio data Srec from recording select unit 29.

To put it in more detail, in a playback operation, audio data decoded by encoder/decoder 212 and then stored in data buffer 220 is sequentially read out from data buffer 220 and supplied to source select unit 28 by way of interface unit 213 as playback data Sd.

If disc 90 mounted on disc recording and playback unit 25 is a CD-RW, a DVD-R, a DVD-RW or the like, for example, data can be recorded into disc 90.

In a recording operation with disc recording and playback unit 25 selected by recording select unit 29, data Srec to be recorded is input through interface unit 213 and supplied to encoder/decoder 212 by way of data buffer 220.

Encoder/decoder 212 adds error correction codes to the to-be-recorded data Srec received from data buffer 220 and carries out processing such as the EFM-plus modulation to encode the data Srec. The encoded data Srec to be recorded is subjected to processes, such as pulse processing and equalization for recording in recorded-signal processing unit 221 before being supplied to laser driver 218. Laser driver 218 drives semiconductor laser diode 204 to emit a laser beam according to the data Srec to be recorded, recording the data Srec onto disc 90. Servo processor 214 executes various kinds of servo control. In particular, servo processor 214 carries out processing such as a focus-servo operation, a focus-search operation, a tracking-servo operation, a tracking-jump/access operation, a sled-servo operation, and a spindle-servo operation in accordance with commands issued by controller 210.

In a focus-search operation, the so-called S-curve of the focus-error signal FE is detected by forcibly moving objective lens 202 along a path between a position farthest from disc 90 and a position closest to disc 90 for a focus-servo lead-in. That is to say, the focus-error signal FE is observed as an S-curve with objective lens 202 being placed in a narrow range over a point serving as an in-focus position for a recording layer of disc 90. By turning on the focus servo in a linear range of the S-curve, a focus-search lead-in is possible. Thus, the focus-search operation is carried out for such a focus-servo lead-in. In a focus-search operation, servo processor 214 applies a drive signal for the focus-search operation to a double-shaft driver 216 to flow a driving current through a focusing coil employed in double-shaft mechanism 203. As a result, objective lens 202 is moved.

In the case of a track jump or an access, double-shaft mechanism 203 moves objective lens 202 in the radial direction of disc 90 and sled mechanism 20.8 moves pickup 201 also in the radial direction of disc 90. A tracking drive signal and a sled drive signal for moving objective lens 202 and pickup 201 as described above are applied by servo processor 214 to double-shaft driver 216 and the sled driver 215, respectively. As a result, the movements in the tracking directions driven by double-shaft mechanism 203 and sled mechanism 208 are accomplished.

In addition, servo processor 214 carries out servo operations by generating a variety of servo drive signals such as focus, tracking, sled, and spindle signals, from signals such as the focus-error signal FE and the tracking-error signal TE received from RF amplifier 209 and a spindle-error signal SPE received from encoder/decoder 212 or controller 210.

A focus drive signal and a tracking drive signal are generated in accordance with the focus-error signal FE and the tracking-error signal TE, respectively, and supplied to double-shaft driver 216. Double-shaft driver 216 flows driving currents based on the focus drive signal and the tracking drive signal, respectively, to a focusing coil and a tracking coil of two-shaft mechanism 203 in order to move objective lens 202. In this way, a tracking servo loop and a focusing servo loop are formed by pickup 201, RF amplifier 209, servo processor 214, and double-shaft driver 216.

In addition, servo processor 214 supplies a spindle drive signal generated in accordance with the spindle-error signal SPE to spindle-motor driver 217. Spindle-motor driver 217 then applies a 3-phase driving signal to spindle motor 206 in accordance with the spindle drive signal in order to rotate spindle motor 206 at a CLV or a CAV.

Servo processor 214 also outputs a spindle drive signal in accordance with a spindle kick/brake control signal received from controller 210 to spindle-motor driver 217 in order to carry out operations such as starting or halting the rotation of spindle motor 206.

Servo processor 214 also generates a sled drive signal based on a sled error signal obtained as a low-region component of the tracking-error signal TE and supplies the sled drive signal to sled driver 215. Sled driver 215 drives sled mechanism 208 in accordance with the sled drive signal. In this way, pickup 201 is slid properly.

Variety of Disc Structures

As described before, disc recording and playback unit 25 is capable of handling disc 90 of CD or DVD type. The structure of recording layers of disc 90 with CD or DVD type is explained as follows.

Recording media, such as disc 90, are classified by recording-layer count into 2 main categories, namely, a single-layer disc and a multi-layer disc. To be more specific, a disc with 1 created recording layer is referred to as a single-layer disc while a disc with 2 or more created recording layers is referred to as a multi-layer disc where a recording layer is defined as a layer on which pits representing recorded data are created.

In addition to the classification of recording media based on the number of recording layers into a single-layer disc and a multi-layer disc as described above, there is also categorization of recording media based on the formation position of the recording layer, that is, the position of the recording layer in the thickness direction of the disc. The categorization is based on a difference between a data recording layer based on the CD system and a data recording layer based on the DVD system.

Since there are differences in recording-layer count and recording-layer formation position as described above, the layer structure of disc 90 may be classified into 4 main categories, as shown in FIGS. 7A through 7D.

It should be noted that the disc diameter may be 8 cm or 12 cm for any disc. The surface of a disc is divided into 3 areas, namely, beginning from the inner circumference, a lead-in area, a data area, and a lead-out area.

A maximum diameter for a position to start the lead-in area may be 45.2 mm and a maximum diameter for a position to start the data area may be 48 mm.

It should be noted that, in the following description, data conforming to the CD system is referred to as CD data and a recording layer for recording CD data is referred to as a CD layer.

CD data may have a data format adopted in CD-DA. CD data is data obtained as a result of modulation of a 16-bit digital audio signal based on the EFM system wherein the 16-bit digital audio signal is samples resulting from sampling at a frequency of 44.1 KHz.

DVD data, which has a quality higher than CD data, conforms to a data format that is used for recording a 1-bit digital audio signal obtained as a result of modulation at a very high sampling frequency of 2.842 MHz, which is 16 times the 44.1 KHz sampling frequency for CD data. Data having the format conforming to the DVD system is referred to as Hi-Definition ("HD") data and a recording layer for recording HD data is referred to as an HD layer.

Differences between CD data and HD data are as follows.

The frequency band of CD data is 5 to 20 KHz while HD data has a broad frequency range from the DC component to 100 KHz.

CD data implements a dynamic range of 98 dB over the entire audio band while HD data is capable of implementing a 120-dB frequency range over the entire audio band.

The minimum pit length of data recorded on a CD layer is 0.83 m while the minimum pit length of data recorded on an HD layer is 0.4 m.

The track pitch of a CD layer is1.6 m while the track pitch of an HD layer is 0.74 m.

The read laser wavelength for a CD layer is 780 nm while that of an HD layer is reduced to 650 nm. As described above, CD data can also be played back at a wavelength of 650 nm, except for a disc dependent on the wavelength, such as a CD-R.

Furthermore, in the case of a CD layer, the lens NA of an optical head is 0.45 while that of an HD layer is 0.6. For NA 0.6, however, the optical head is also capable of dealing with a CD layer.

As described above, by merely changing the minimum pit length, the track pitch, the lens numerical aperture NA and the laser wavelength, the storage capacity can be increased from 780 MB for data stored on a CD layer to a large value of 4.7 Gigabytes ("GB") for data stored on an HD layer.

4 types of discs having layers for recording CD data and/or HD data with a single-layer structure or a multi-layer structure include a single-plate disc, a single-layer HD disc, a hybrid disc, and a multi-layer HD disc.

Single-Plate Discs

Single-plate discs include the CD-DA, the CD-R, the CD-ROM, and the CD-RW.

Figure 7A:
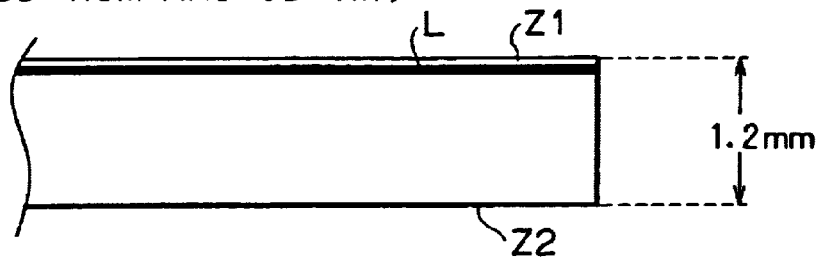
FIGS. 7A through 7D are diagrams showing types of discs used in accordance with an embodiment of the present invention.

As shown in FIG. 7A, a single-plate disc includes a recording layer L that is created at a position separated away from a disc surface Z2 by a distance of about 1.2 mm, that is, at a position in close proximity to a level plane Z1. Disc surface Z2 is a laser incidence surface of the disc.

Recording layer L is used as the CD layer for recording CD data.

Single-Layer HD Discs

Single-layer HD discs include the single-layer DVD-ROM, the single-layer DVD-R, and the single-layer DVD-RW. The single-layer HD disc conforms to the DVD specifications.

Figure 7B:
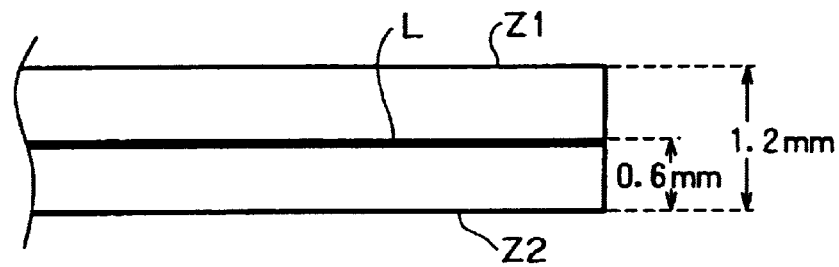

As shown in FIG. 7B, in the case of the single-layer HD disc, a recording layer L is created at a position separated away from a disc surface Z2 by a distance of about 0.6 mm, that is, at a position at approximately the middle in the thickness direction. Disc surface Z2 is a laser incidence surface.

Since the single-layer HD disc may be a medium for recording audio data as HD data, audio data can be reproduced in a playback operation at a quality higher than that of other discs, such as CD-DAs.

Hybrid Discs

The hybrid disc may also be referred to as the SACD.

Figure 7C:
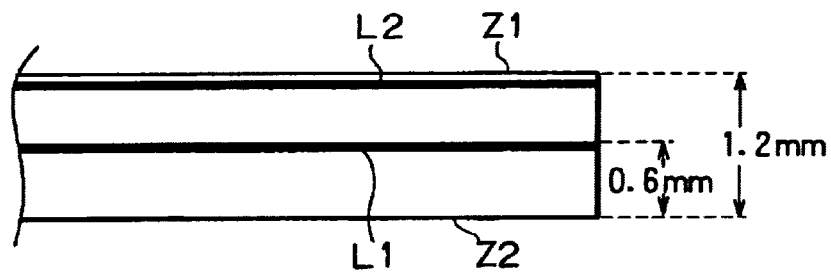

As shown in FIG. 7C, in the case of the hybrid disc, a first recording layer L1 is created at a position separated away from a disc surface Z2 by a distance of about 0.6 mm and a second recording layer L2 is created at a position separated away from disc surface Z2 by a distance of about 1.2 mm, that is, at a position in close proximity to a level plane Z1. Disc surface Z2 is a laser incidence surface.

First recording layer L1 is an HD layer for recording HD data whereas second recording layer L2 is a CD layer for recording CD data.

Data or a program, such as a piece of music, may be recorded on such a hybrid disc SACD as data on one layer with the same data also being recorded on the other layer. For example, a set of data, such as a piece of music, may be recorded on the CD layer as CD data with an ordinary quality, and the same set of data may also be recorded on the HD layer as HD data with a quality higher than the ordinary quality. By storing data in this way, the data may be played back from the CD layer by using a contemporary CD player. The data with a high quality recorded on the HD layer may be played back using a player equipped to read the HD layer.

Thus, a hybrid disc may be played back using a CD player or a playback apparatus for HD data.

It is noted that disc recording and playback unit 25 of recording and playback apparatus 10 is capable of playing back data recorded on either a CD layer or an HD layer.

Multi-Layer HD Discs

Figure 7D:
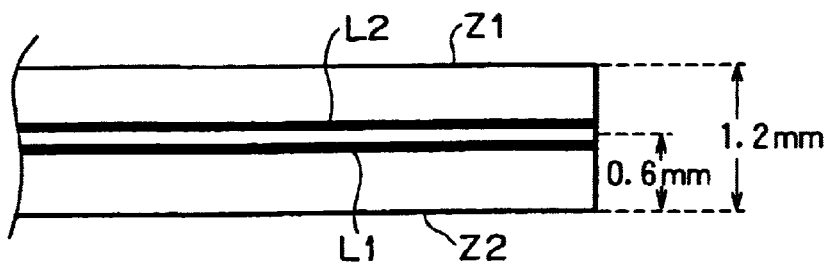

Multi-layer HD discs include the multi-layer DVD-ROM, the multi-layer DVD-R and the multi-layer DVD-RW. The multi-layer HD disc can be regarded as a disc obtained by physically combining single-layer HD discs. As shown in FIG. 7D, the multilayer HD disc comprises a first recording layer L1 and a second recording layer L2, which are both an HD layer for recording HD data.

Both first and second recording layers L1 and L2 are created at a position separated away from a disc surface Z2 by a distance of about 0.6 mm, that is, at a position in about the middle in the thickness direction. Disc surface Z2 is a laser incidence surface.

Since the multi-layer HD disc is a recording medium on which audio data is recorded as HD data, the audio data can be played back at a quality higher than that of, say, a CD-DA. In addition, the storage capacity of the multi-layer HD disc is twice that of the single-layer HD disc.

Disc Identification Technique

The following description explains a method for determining the type of disc 90 mounted on disc recording and playback unit 25.

As described earlier, there are 4 types of discs, namely, a single-plate disc, a single-layer HD disc, a hybrid disc, and a multi-layer HD disc, with structures of recording layers thereof shown in FIGS. 7A through 7D.

When objective lens 202 is moved in the focus direction while a laser beam is being radiated to disc 90, differences in in-focus timing and in-focus count can be observed and used for determining the type of disc 90.

Much like a focus-search operation, objective lens 202 is moved and, at that time, the timing with which an S-curve is observed and the number of times the S-curve is observed are detected.

FIGS. 8A through 8D are diagrams showing a case in which a single-plate disc is mounted on the disc recording and playback unit 25. In this case, objective lens 202 is moved from a bottom position shown in FIG. 8A to a top position shown in FIG. 8D. The range between the bottom position and the top position is a focus search range over which objective lens 202 is moved at a predetermined speed.

When the laser beam is focused on disc surface Z2 as shown in FIG. 8B, detector 205 of pickup 201 receives a beam reflected by disc surface Z2 with the quantity of light of a certain degree and a pulse is observed as a mirror signal MR.

It is noted that a beam reflected by disc surface Z2 is observed as a mirror signal MR because the gain of RF amplifier 209 is set at a high value during a focus-search operation.

When the laser beam is focused on recording layer L, as shown in FIG. 8C, detector 205 of pickup 201 receives a beam reflected by disc surface Z2 with the quantity of light determined by the reflectance of disc 90 and a pulse is observed as a mirror signal MR. At that time, an S-curve is also observed as the focus-error signal FE.

Thus, when objective lens 202 is moved from the bottom position shown in FIG. 8A to the top position shown in FIG. 8D, a time to the in-focus state with respect to recording layer L, shown in FIG. 8C, is measured with the timing of reflection by disc surface Z2 of FIG. 8B taken as a reference. Since the time to the in-focus state with respect to recording layer L and the number of times the in-focus state is reached vary in dependence on the layer structure shown in FIGS. 7A through 7D, the type of disc 90 can be identified.

FIGS. 9A through 9D are diagrams showing how the observed S-curve and the detected mirror signal MR vary from disc to disc.

FIG. 9A is a diagram showing a case in which disc 90 is a single-plate disc.

In this case, recording layer L exists at a position in close proximity to level plane Z1. Thus, after a typical time t1 lapses from when the mirror signal MR is detected at a point of time an in-focus state with respect to disc surface Z2 of disc 90 is reached, an S-curve and a mirror signal MR are detected.

FIG. 9B is a diagram showing a case in which disc 90 is a single-layer HD disc. In this case, recording layer L exists in about the middle of disc 90 in the thickness direction. Thus, after a time t2 lapses from when the mirror signal MR is detected, at a point of time an in-focus state with respect to disc surface Z2 of disc 90 is reached, an S-curve and a mirror signal MR are detected. Time t2 has a length of about half the length of time t1.

FIG. 9C is a diagram showing a case in which disc 90 is a hybrid disc. In this case, first recording layer L1 exists in about the middle of disc 90 in the thickness direction. On the other hand, second recording layer L2 exists at a position in close proximity to level plane Z1. Thus, after time t2 lapses from when the mirror signal MR is detected, at a point of time an in-focus state with respect to disc surface Z2 of disc 90 is reached, an S-curve and a mirror signal MR are detected. Then, after time t1 lapses from when the mirror signal MR is detected, at a point of time an in-focus state with respect to disc surface Z2 of disc 90 is reached, an S-curve and a mirror signal MR are detected.

FIG. 9D is a diagram showing a case in which disc 90 is a multi-layer HD disc. In this case, both first and second recording layers L1 and L2 exist in about the middle of disc 90 in the thickness direction. Thus, after time t2 lapses from when the mirror signal MR is detected, at a point of time an in-focus state with respect to disc surface Z2 of disc 90 is reached, an S-curve and a mirror signal MR are detected twice.

Thus, when disc 90 is mounted as described above, controller 210 moves objective lens 202 like a movement in a focus-search operation. At that time, the timing with which the mirror signal MR and the focus-error signal FE are detected and the number of times the mirror signal MR and the focus-error signal FE are detected are monitored, and the result of the observation can be used to determine whether mounted disc 90 is a single-plate disc, a single-layer HD disc, a hybrid disc, or a multi-layer HD disc.

It is noted that the operation to identify the type of disc 90 can be carried out separately from a focus-search operation. As an alternative, the type of disc 90 may be identified during a focus-search operation.

In addition, the operation to identify the type of disc 90 can also be carried out while objective lens 202 is being lowered.

In an operation to identify the type of disc 90, a laser beam is radiated to disc 90 and information conveyed by a beam reflected by disc 90 is obtained. As a position on disc 90 to which the laser beam is radiated, an inner circumference of disc 90 hardly affected by a skew error is preferable even though an outer circumference may also be used.

Identification Processing of the Recording and Playback Apparatus and Recording Control Processing of the Memory Card The following description explains typical processing to identify the type of disc 90 by using the identification technique described above and operations to control recording of data into memory card 1 by memory-card recording and playback unit 27 in recording and playback apparatus 10.

Figure 10:
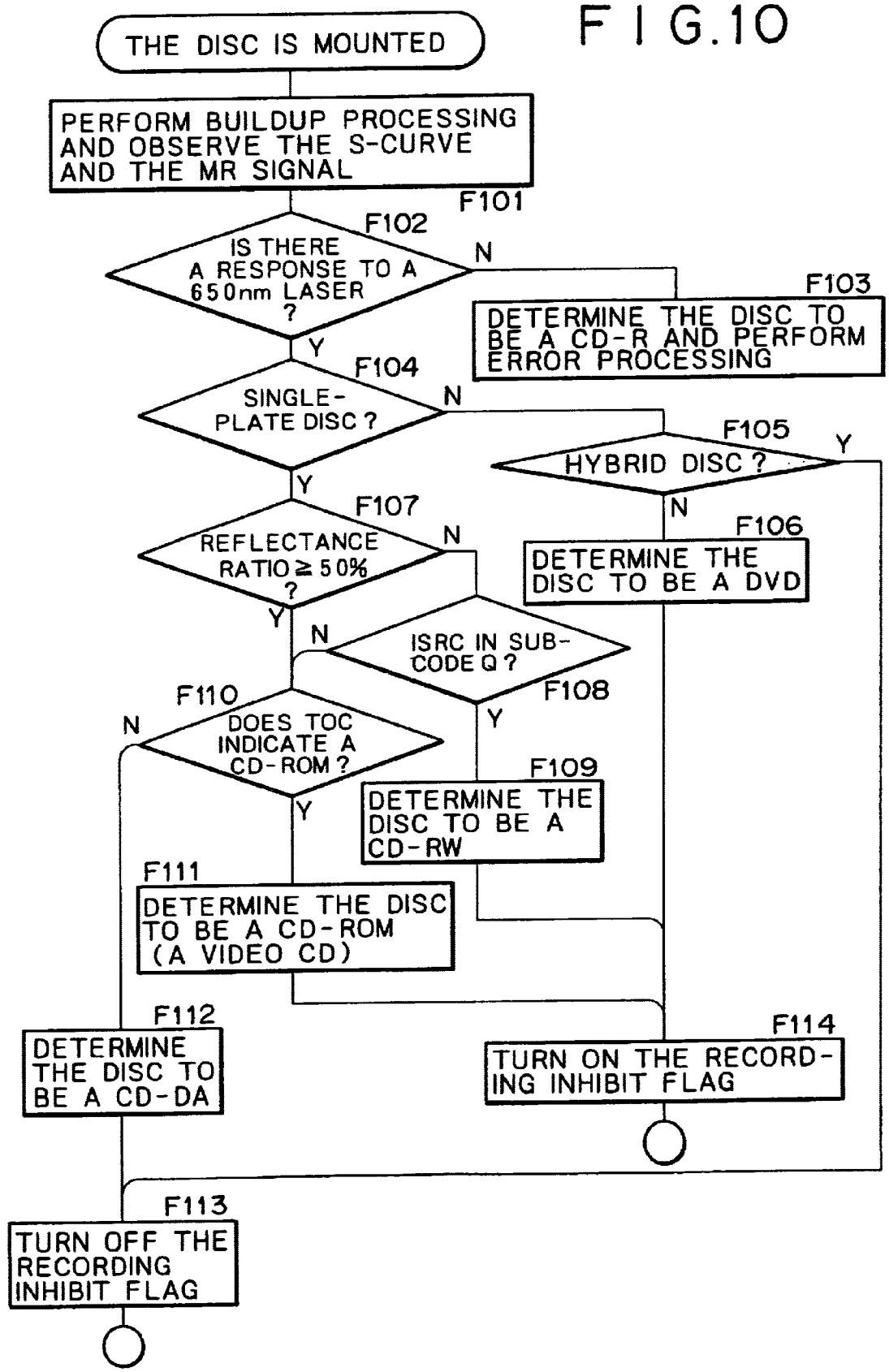
FIG. 10 shows a flowchart representing processing which is carried out when a disc is mounted in accordance with an embodiment of the present invention.

The description begins with an explanation of processing which is carried out by system controller 20 when the user mounts disc 90 onto disc recording and playback unit 25 with reference to a flowchart shown in FIG. 10.

Processing represented by the flowchart shown in FIG. 10 is started by system controller 20 when an operation to mount disc 90 through disc insertion unit 13 is detected. As shown in FIG. 10, processing begins with a step F101 at which system controller 20 issues a command to controller 210 of disc recording and playback unit 25 to begin buildup processing. Receiving the command, controller 210 drives servo processor 214 and other components to carry out the following processing.

First, the spindle motor 206 is activated to set the rotation of disc 90 at a CLV or a CAV.

At the same time, semiconductor laser diode 204 starts emitting a laser beam.

In addition, a focus-search operation is executed. At a point in time, objective lens 202 enters a focus lead-in area, the focusing servo is turned on and established.

At the same time, the mirror signal MR is observed as described earlier with reference to FIGS. 9A through 9D to determine which one of the 4 types of recording layer structure disc 90 has.

As the focusing servo is set, the tracking servo is established to allow information to be read out from disc 90.

When these pieces of processing are completed, management information of disc 90, such as TOC information of a CD-DA or the like, is read.

Then, controller 210 transfers necessary information on the buildup processing, such as disc identification information and information indicating completion of the buildup processing, to system controller 20.

Receiving the information on the buildup processing carried out by disc recording and playback unit 25 at step F101, system controller 20 forms a judgment, at a step F102, as to whether or not the buildup processing has been completed properly.

When the user mounts a CD-R by mistake, for example, disc recording and playback unit 25 may not complete the buildup processing properly. This is because semiconductor laser diode 204 outputs, for illustrative purposes, a laser beam having a wavelength of 650 nm. As described earlier, with a laser beam having a wavelength of 650 nm, the CD-R does not respond, and so a recording or playback operation can not be carried out correctly.

If a proper response can not be obtained in the buildup processing, as described above, the flow of the processing goes on to a step F103 at which mounted disc 90 is determined to be a CD-R and error processing is carried out. For example, display unit 12 may show a message indicating that disc 90 is not proper for recording and playback apparatus 10.

It should be noted that the buildup processing cannot be completed properly in some cases because of a scratch on disc 90 or an operation problem of disc recording and playback unit 25 even if the type of disc 90, such as CD-DA or the DVD-ROM, is suitable for recording and playback apparatus 10. In such cases, the error processing is carried out at step F103.

If the buildup processing is completed normally, the flow of the processing carried out by system controller 20 goes on to a step F104 at which controller 210 forms a judgment as to whether or not disc 90 is a single-plate disc in accordance with the type identification information based on the mirror signal MR. The outcome of the judgment determines the branch destination of the flow of the processing.

To be more specific, if the outcome of the judgment indicates that disc 90 is not a single-plate disc, the flow of the processing goes on to a step F105 to form a judgment as to whether or not disc 90 is a hybrid disc. If the outcome of the judgment formed at step F105 indicates that disc 90 is not a hybrid disc, that is, if mounted disc 90 is a single-layer HD disc or a multi-layer HD disc, the flow of the processing goes on to a step F106 to determine that disc 90 is a DVD-type disc, such as a DVD-ROM, a DVD-R, or a DVD-RW.

Then, the flow of the processing proceeds to a step F114 at which a recording inhibit flag is turned on. The recording inhibit flag inhibits an operation to record data into memory card 1.

If the outcome of the judgment formed at step F105 indicates that disc 90 is a hybrid disc, on the other hand, the flow of the processing proceeds to a step F113 at which a recording inhibit flag is turned off.

If the outcome of the judgment formed at step F104 indicates that disc 90 is a single-plate disc, that is, if disc 90 is a CD-type disc, such as a CD-DA, a CD-ROM, or a CD-RW, the flow of the processing goes on to a step F107 to form a judgment as to whether or not the reflectance ratio of a beam reflected by disc 90 is at least 50%.

The reflectance ratio is typically determined as follows. While the power of a laser beam emitted by semiconductor laser diode 204 is being increased gradually, a point of time at which a proper RF signal is obtained is monitored.

In the case of a CD-DA or a CD-ROM, a reflectance ratio greater than 70% to 80% is normally obtained. In the case of a CD-RW, on the other hand, the reflectance ratio does not exceed half that of a CD-DA or a CD-ROM. Thus, a reflectance ratio of 50% or smaller indicates that disc 90 is a CD-RW.

In rare cases, however, the reflectance ratio of a CD-DA or a CD-ROM is 50% or smaller due to stains on disc 90 or a manufacturing problem thereof. For this reason, even if the reflectance ratio is found equal to or smaller than 50% at step F107, the flow of the processing continues to a step F108 at which sub-code Q data of management information read in during the buildup processing or sub-code Q data read in at the present point of time is verified to form a judgment as to whether or not the sub-codes include International Standard Recording Code ("ISRC"). The ISRC is a kind of copyright code. In the case of a CD-RW, the sub-codes include an ISRC. Thus, the existence of an ISRC indicates that disc 90 is a CD-RW. That is to say, disc 90 is determined to be a CD-RW at a step F109.

After disc 90 is determined to be a CD-RW at step F109, the flow of the processing goes on to step F114 at which the recording inhibit flag is turned on.

If the outcome of the judgment formed at step F107 indicates that the reflectance ratio exceeds 50% or the outcome of the judgment formed at step F108 indicates that an ISRC does not exist, on the other hand, the flow of the processing goes on to a step F110 to form a judgment as to whether disc 90 is a CD-DA or a CD-ROM.

The formation of the judgment at step F110 is based on TOC data read in from disc 90. A type identification code in the TOC data indicates whether disc 90 is a CD-DA or a CD-ROM.

If the type identification code acquired from the TOC data indicates that disc 90 is a CD-ROM, the flow of the processing goes on to a step F111 at which disc 90 is determined to be a CD-ROM. Then, the flow of the processing goes on to the step F114 at which the recording inhibit flag is turned on.

If the type identification code acquired from the TOC data indicates that disc 90 is a CD-DA, on the other hand, the flow of the processing goes on to a step F112 at which disc 90 is determined to be a CD-DA. Then, the flow of the processing goes on to a step F113 at which the recording inhibit flag is turned off.

As described above, the recording inhibit flag is turned on or off in dependence on the type of mounted disc 90.

Figure 11:
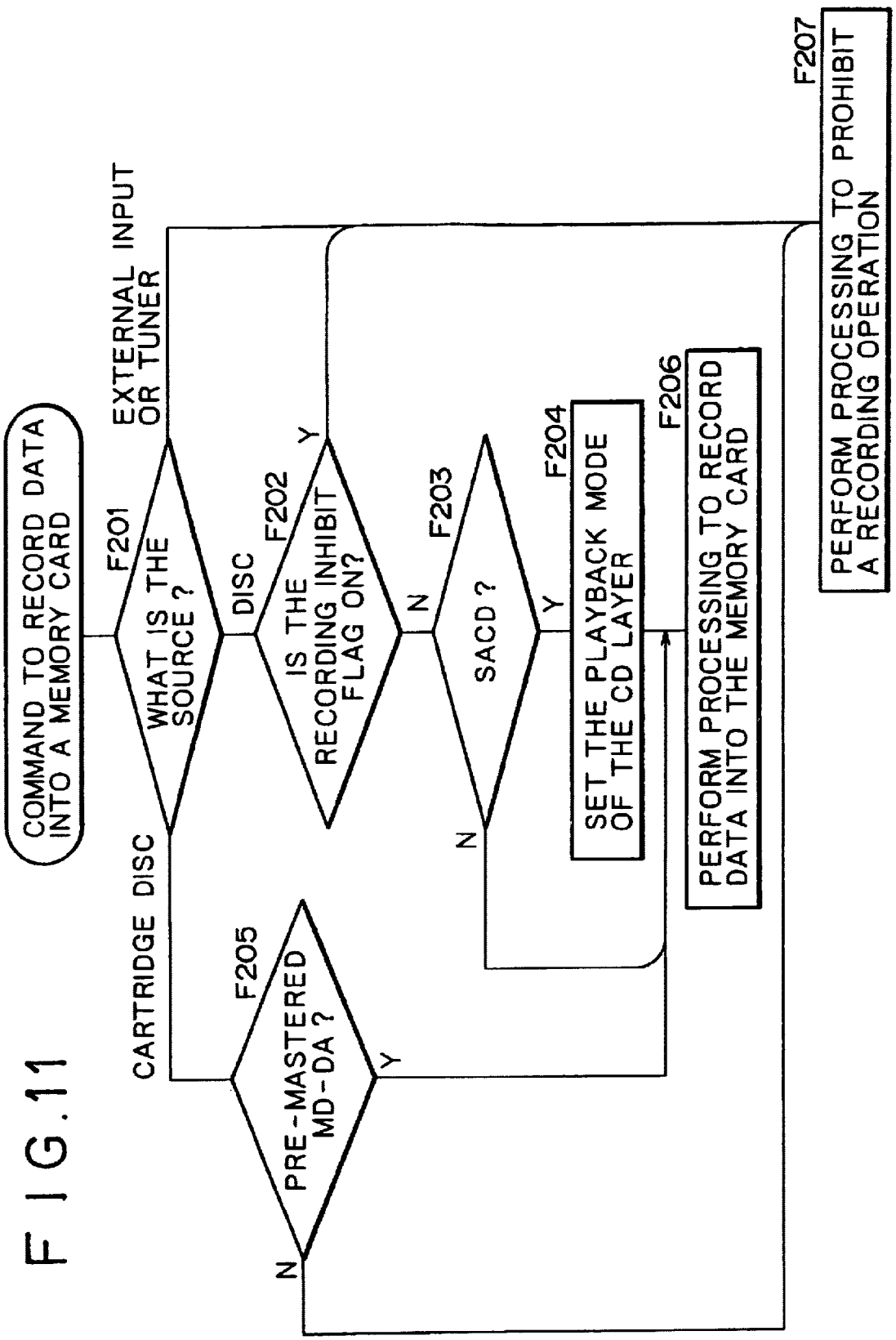
FIG. 11 shows a flowchart representing processing to record information onto a memory card in accordance with an embodiment of the present invention.

The following description explains processing, which is carried out by system controller 20 when a recording command is issued to memory card 1 mounted on memory-card recording and playback unit 27, with reference to a flowchart shown in FIG. 11.

By operating operators 16 and touch panel 17, the user is able to select a source and record audio data from the selected source into memory card 1. When a command to record audio data into memory card 1 is received, at the first step F201 of the flowchart shown in FIG. 11, system controller 20 identifies which source of the audio data was selected by the user. The selected source is a component selected by source select unit 28.

If the selected source is disc 90 undergoing a playback operation in disc recording and playback unit 25, the flow of the processing goes on to a step F202 to form a judgment as to whether or not the recording inhibit flag has been turned on. The recording inhibit flag is turned on or off when disc 90 is mounted as illustrated in FIG. 10.

As described above, the processing represented by the flowchart shown in FIG. 10 is carried out when disc 90 is mounted. It should be noted, however, that the processing to set the recording inhibit flag based on the identification of the type of disc 90 carried out at step F102 and the subsequent steps can also be performed at a point in time in the flowchart shown in FIG. 11. That is to say, the processing to set the recording inhibit flag can also be carried out when a command to record audio data into memory card 1 is received with disc recording and playback unit 25 selected as a source of the audio data.

As is obvious from the description of the processing represented by the flowchart shown in FIG. 10, if disc 90 is a disk of the DVD type, a CD-ROM or a CD-RW, the recording inhibit flag is turned on. In this case, the flow of the processing goes on from step F202 to a step F207 at which system controller 20 carries out processing to inhibit recording of audio data by memory-card recording and playback unit 27. That is to say, in this case, even if playback data Sd generated by disc recording and playback unit 25 is supplied to memory-card recording and playback unit 27 as data Srec to be recorded, control is executed to prevent memory-card recording and playback unit 27 from recording the data Srec into memory card 1.

From the user's point of view, the operation carried out by the user to start recording audio data into memory card 1 is not accomplished as intended.

If the outcome of the judgment formed at step F202 indicates that the recording inhibit flag has been turned off, that is, if disc 90 is a CD-DA or a hybrid disc (SACD), on the other hand, the flow of the processing goes on to a step F203 to form a judgment as to whether disc 90 is a CD-DA or a hybrid disc (SACD). If disc 90 is a CD-DA, the flow of the processing goes on to a step F206 at which audio data is recorded into memory card 1.

That is to say, memory-card recording and playback unit 27 is controlled so that playback data Sd generated by disc recording and playback unit 25 and supplied to memory-card recording and playback unit 27 as data Srec is recorded into memory card 1 with a timing to start the recording determined by an operation carried out by the user.

If the outcome of the judgment formed at step F203 indicates that disc 90 is a hybrid disc (SACD), on the other hand, the flow of the processing goes on to a step F204 at which a command is issued to disc recording and playback unit 25 to set a playback mode of CD layer. Then, the flow of the processing goes on to step F206 at which audio data is recorded into memory card 1.

That is to say, memory-card recording and playback unit 27 is controlled so that playback data Sd generated by disc recording and playback unit 25 and supplied to memory-card recording and playback unit 27 as data Srec is recorded into memory card 1 with a timing to start the recording determined by an operation carried out by the user.

As described above, audio data is recorded onto the CD layer of the hybrid disc in the same format as the CD-DA.

If cartridge-disc 91 is identified as a source at step F201, on the other hand, the flow of the processing carried out by system controller 20 goes on to a step F205 to form a judgment as to whether or not cartridge-disc 91 mounted on cartridge-disc recording and playback unit 26 is a pre-mastered MD-DA.

The judgment can be formed by reading in type identification data included in TOC data of cartridge-disc 91 (e.g., an MD). That is to say, the judgment can be formed at a point in time cartridge-disc 91 is mounted.

It should be noted that the pre-mastered MD-DA is a playback-only cartridge-disc for storing all management information and all audio data as emboss pits.

On the other hand, the recordable MD-DA is a magneto-optical disc which allows the user to record and play back audio data into and from the disc.

The MD-DATA is also a magneto-optical disc which is a medium for handling data for computer applications.

If the outcome of the judgment formed at step F205 indicates that cartridge-disc 91 is not a pre-mastered MD-DA, that is, if cartridge-disc 91 is a recordable MD-DA or an MD-DATA, the flow of the processing goes on to step F207 at which system controller 20 carries out processing to inhibit recording of audio data by memory-card recording and playback unit 27. That is to say, in this case, even if playback data Smd generated by cartridge-disc recording and playback unit 26 is supplied to memory-card recording and playback unit 27 as data Srec to be recorded, control is executed to prevent memory-card recording and playback unit 27 from recording the data Srec into memory card 1.

From the user's point of view, the operation carried out by the user to start recording audio data into memory card 1 is not accomplished as intended.

If the outcome of the judgment formed at step F205 indicates that cartridge-disc 91 is a pre-mastered MD-DA, on the other hand, the flow of the processing goes on to step F206 at which audio data is recorded into memory card 1.

That is to say, memory-card recording and playback unit 27 is controlled so that playback data Smd generated by cartridge-disc recording and playback unit 26 and supplied to memory-card recording and playback unit 27 as data Srec is recorded into memory card 1 with a timing to start the recording determined by an operation carried out by the user.

If the an external input from terminal 21 or AM/FM tuner 24 is identified at step F201 as a source, the flow of the processing goes on to step F207 at which system controller 20 carries out processing to inhibit recording of audio data by the memory-card recording and playback unit 27. That is to say, in this case, even if external input data Sin or broadcast audio data Stu is supplied to memory-card recording and playback unit 27 as data Srec to be recorded, control is executed to prevent memory-card recording and playback unit 27 from recording the external input data Sin or the broadcast audio data Stu into memory card 1.

From the user's point of view, the operation carried out by the user to start recording audio data into memory card 1 is not accomplished as intended.

As described above, in the processing represented by the flowchart shown in FIG. 11, permission and prohibition to dub or record audio data into memory card 1 is controlled.

Dubbing from a CD-DA to memory card 1 is permitted. It is noted that a disc for recording text data or picture data, such as CD-TXT and CD-G (CD-Graphic), as subcode pertains to the CD-DA category.

In addition, dubbing from a hybrid disc (SACD) to memory card 1 is permitted only for data played back from a CD layer. Dubbing from a pre-mastered MD-DA to memory card 1 is also permitted.

That is to say, in the illustrative embodiment, recording of data from a recording medium to memory card 1 is permitted provided that the recording medium is a playback-only medium for recording data all as emboss pits, and main data excluding the TOC and management information of subcodes is audio data only, that is, the main data does not include other kinds of information such as picture data.

Dubbing from recording media other than those described above to memory card 1 is prohibited in accordance with an embodiment of the invention. To be more specific, the recording media, the dubbing of data of which is prohibited, are the CD-ROM including discs conforming to CD-ROM specifications such as the video CD, the CD-RW, the CD-R, the DVD-ROM, the DVD-R, the DVD-RW, the recordable MD-DA and the MD-DATA.

It is noted that an MO-disc recording and playback unit for MO (magneto-optical) discs generally used in computer applications may also be included. Nevertheless, recording of data from an MO disc to memory card 1 may be prohibited even if such an MO-disc recording and playback unit is provided.

Dubbing of audio data to memory card 1 from AM/FM tuner 24 and terminal 21 for receiving an external input is also prohibited according to the illustrative embodiment.

If terminal 21 is connected to an external apparatus for playing back data of a recording medium such as a DVD, from which recording of data to memory card 1 is prohibited, inhibiting the dubbing of audio data to memory card 1 from terminal 21 prevents an operation to record data played back from the recording medium mounted on the external apparatus connected to terminal 21 into memory card 1.

In addition, a transmitter can be connected to an external apparatus for playing back data of a recording medium such as a DVD, from which recording of data to memory card 1 is prohibited. The transmitter is then capable of transmitting the playback data to AM/FM tuner 24 employed in recording and playback apparatus 10 typically as an FM wave. By inhibiting the dubbing of audio data to memory card 1 from AM/FM tuner 24, however, it is possible to prevent an operation to record data played back from the recording medium on the external apparatus and transmitted by the transmitter to recording and playback apparatus 10 into memory card 1.

Recording and playback apparatus 10 implemented by the embodiment and, in particular, control to permit or prohibit an operation to record data into memory card 1 has been explained so far. A number of configurations of recording and playback apparatus 10, a number of control techniques and a number of ways to set permission and prohibition of an operation to dub data into memory card 1 for different types of recording media may also be used.

For example, in the illustrative embodiment, recording of data from a recording medium to memory card 1 is permitted provided that the recording medium is a playback-only medium for recording data all as emboss pits, and main data excluding the TOC and management information of subcodes is audio data only as described above. In this case, a number of conditions for the recording medium are possible.

For example, the condition for the recording medium may be relieved so that dubbing of data from the recording medium to memory card 1 is permitted provided that the recording medium is a playback-only medium for recording data all as emboss pits. Under such a relieved condition, recording of data from a CD-ROM and a DVD-ROM to memory card 1 may also be permitted in addition to the recording from a CD-DA.

As an alternative, dubbing of data from any recording medium to memory card 1 may be permitted provided that the data to be recorded is audio data.

In addition, instead of the physical condition of the recording medium, a condition based on a variety of circumstances can be applied. For example, permission and prohibition of dubbing data to memory card 1 can be set in detail for each type of recording medium. To be more specific, for example, dubbing of data from a CD-DA or a DVD-ROM to memory card 1 is permitted but dubbing of data from an MD-DA to memory card 1 is not.

As is obvious from the above description, in an operation to record information played back from a first recording medium into a second recording in accordance with the present invention, control is executed to permit or prohibit the operation to record (dub or copy) the information into the second recording medium on the basis of a judgment as to whether the first recording medium is a recording medium with a dubbing operation permitted or prohibited. Thus. the control can be executed to permit or prohibit the operation to copy the information in accordance with the type of the first recording medium, exhibiting an effect of implementability of proper copy management according to types of a variety of recording media, a variety of applications and a variety of data formats.

In addition, according to the illustrative embodiment, the formation of the judgment as to whether the first recording medium is a recording medium with a dubbing operation permitted or prohibited is based on information conveyed by a beam reflected from the first recording medium or predetermined identification information recorded on the first recording medium. As a result, the illustrative embodiment is advantageous in that there in no need to provide a special circuit for forming the judgment.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

What is claimed is:

1. A recording apparatus, comprising:

recording means for recording information played back from a first recording medium into a second recording medium, said recording means comprising a first security block having an encryption circuit and an authentication processing circuit, said first recording medium comprising a second security block;

judgment means for forming a judgment as to whether said first recording medium is allowed to be dubbed or prohibited from being dubbed;

random-number generation circuit means for generating a session key to be shared with said second security block if said judgement formed from said judging means indicates that said first recording medium is allowed to be dubbed; and control means for inhibiting said recording means from recording information played back from said first recording medium into said second recording medium when said judgment formed by said judgment means indicates that said first recording medium is prohibited from being dubbed;

wherein said first security block sends first authentication data to said second security block which generates second authentication data and adds this second authentication data to the first authentication data and sends both authentication data to said recording means to form said judgment.

2. The recording apparatus according to claim 1, wherein said first recording medium includes a disc shape.

3. The recording apparatus according to claim 2, wherein said judgment means forms said judgment based on information conveyed by a beam reflected from said first recording medium.

4. The recording apparatus according to claim 2, wherein said judgment means forms said judgement based on predetermined identification information recorded on said first recording medium.

5. The recording apparatus according to claim 1, wherein said second recording medium is a non-volatile memory.

6. The recording apparatus according to claim 1, wherein said judgment means forms said judgement based on a type of said first recording medium.

7. The recording apparatus according to claim 6, wherein said first recording medium is one of a playback type medium that is allowed to be dubbed and a recordable type medium that is prohibited from being dubbed.

8. The recording apparatus according to claim 6, wherein said first recording medium is one of a playback type medium, with all information being recorded therein using emboss pits, that is allowed to be dubbed and a medium of a type other than said playback type that is prohibited from being dubbed.

9. The recording apparatus according to claim 6, wherein said first recording medium is one of a playback type medium, with all information representing management information and audio data being recorded therein using emboss pits, that is allowed to be dubbed and a medium of a type other than said playback type that is prohibited from being dubbed.

10. A recording and playback apparatus, comprising:

playback means for playing back information from a first recording medium;

recording means for recording information played back from said first recording medium into a second recording medium, said recording means comprising a first security block having an encryption circuit and an authentication processing circuit, said first recording medium comprising a second security block;

judgment means for forming a judgment as to whether said first recording medium is allowed to be dubbed or prohibited from being dubbed;

random-number generation circuit means for generating a session key to be shared with said second security block if said judgement formed from said judging means indicates that said first recording medium is allowed to be dubbed; and control means for inhibiting said recording means from recording information played back from said first recording medium into said second recording medium when said judgment formed by said judgment means indicates that said first recording medium is prohibited from being dubbed wherein said first security block sends first authentication data to said second security block which generates second authentication data and adds this second authentication data to the first authentication data and sends both authentication data to said recording means to form said judgment.

11. The recording and playback apparatus according to claim 10, wherein said first recording medium includes a disc shape.

12. The recording and playback apparatus according to claim 11, wherein said judgment means forms said judgment based on information conveyed by a beam reflected from said first recording medium.

13. The recording and playback apparatus according to claim 11, wherein said judgment means forms said judgement based on predetermined identification information recorded on said first recording medium.

14. The recording and playback apparatus according to claim 10, wherein said second recording medium is a non-volatile memory.

15. The recording and playback apparatus according to claim 10, wherein said judgment means forms said judgement based on a type of said first recording medium.

16. The recording and playback apparatus according to claim 15, wherein said first recording medium is one of a playback type medium that is allowed to be dubbed and a recordable type medium that is prohibited from being dubbed.

17. The recording and playback apparatus according to claim 15, wherein said first recording medium is one of a playback type medium, with all information being recorded therein using emboss pits, that is allowed to be dubbed and a medium of a type other than said playback type that is prohibited from being dubbed.

18. The recording and playback apparatus according to claim 15, wherein said first recording medium is one of a playback type medium, with all information representing management information and audio data being recorded therein using emboss pits, that is allowed to be dubbed and a medium of a type other than said playback type that is prohibited from being dubbed.

19. A recording method, comprising the steps of:

recording information played back from a first recording medium into a second recording medium comprising a first security block having an encryption circuit and an authentication processing circuit, said first recording medium comprising a second security block;

forming a judgment as to whether a first recording medium is allowed to be dubbed or prohibited from being dubbed;

generating a session key to be shared with said second security block if said judgement formed indicates that said first recording medium is allowed to be dubbed;

recording information played back from said first recording medium into a second recording medium when said judgment formed at said judgment step indicates that said first recording medium is allowed to be dubbed; and inhibiting an operation to record information played back from said first recording medium into said second recording medium when said judgment formed at said judgment step indicates that said first recording medium is prohibited from being dubbed;

wherein said first security block sends first authentication data to said second security block which generates second authentication data and adds this second authentication data to the first authentication data and sends both authentication data back to the first security block to form said judgment.

20. The recording method according to claim 19, wherein said first recording medium includes a disc shape.

21. The recording method according to claim 20, wherein said judgment is formed based on information conveyed by a beam reflected from said first recording medium.

22. The recording method according to claim 20, wherein said judgment is formed based on predetermined identification information recorded on said first recording medium.

23. The recording method according to claim 19, wherein said second recording medium is a non-volatile memory.

24. The recording method according to claim 19, wherein said judgment is formed based on a type of said first recording medium.

25. The recording method according to claim 24, wherein said first recording medium is one of a playback type medium that is allowed to be dubbed and a recordable type medium that is prohibited from being dubbed.

26. The recording method according to claim 24, wherein said first recording medium is one of a playback type medium, with all information being recorded therein using emboss pits, that is allowed to be dubbed and a medium of a type other than said playback type that is prohibited from being dubbed.

27. The recording method according to claim 24, wherein said first recording medium is one of a playback type medium, with all information representing management information and audio data being recorded therein using emboss pits, that is allowed to be dubbed and a medium of a type other than said playback type that is prohibited from being dubbed.

* * * * *